US007734957B2

(12) United States Patent
Nakamura et al.

(10) Patent No.: US 7,734,957 B2
(45) Date of Patent: Jun. 8, 2010

(54) HIGHLY RELIABLE STORAGE SYSTEM AND INTERNAL NETWORK THEREOF

(75) Inventors: Shuji Nakamura, Machida (JP); Akira Fujibayashi, Sagamihara (JP); Mutsumi Hosoya, Fujimi (JP)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 11/638,329

(22) Filed: Dec. 12, 2006

(65) Prior Publication Data

US 2008/0082746 A1 Apr. 3, 2008

(30) Foreign Application Priority Data

Sep. 28, 2006 (JP) ............................ 2006-264147

(51) Int. Cl.
*G06F 11/20* (2006.01)

(52) U.S. Cl. .............................. 714/25; 714/7; 714/55; 714/27; 714/48; 711/133; 711/148; 370/217; 709/239

(58) Field of Classification Search ....................... None
See application file for complete search history.

(56) References Cited

U.S. PATENT DOCUMENTS

| | | | | |
|---|---|---|---|---|
| 6,477,619 | B1 * | 11/2002 | Fujimoto et al. | 711/114 |
| 6,519,680 | B2 | 2/2003 | Fujimoto et al. | |
| 7,337,353 | B2 | 2/2008 | Yamamoto et al. | |
| 2005/0025045 | A1 | 2/2005 | Shimozono et al. | |
| 2005/0229034 | A1 * | 10/2005 | Fujibayashi | 714/11 |

FOREIGN PATENT DOCUMENTS

| | | | |
|---|---|---|---|
| JP | 2001-094584 | | 4/2001 |
| JP | 2001-256003 | | 9/2001 |
| JP | 2002-358170 | | 12/2002 |
| JP | 2003-233514 | A | 8/2003 |
| JP | 2005-051335 | A | 2/2005 |
| JP | 2005-326935 | A | 11/2005 |

OTHER PUBLICATIONS

Japan Patent Office (JPO) office action for JPO patent application JP2006-264147 (Jan. 8, 2009).

Japan Patent Office (JPO) office action for JPO patent application JP2006-264147 (May 26, 2009).

* cited by examiner

*Primary Examiner*—Christian P Chace
*Assistant Examiner*—Alan Otto
(74) *Attorney, Agent, or Firm*—Townsend and Townsend and Crew LLP

(57) ABSTRACT

The disk controller has a plurality of channel control units, a plurality of cache memories, a plurality of disk control units, and a plurality of internal switch units. Each channel control unit or disk control unit sends to one of the cache memory units a request packet requesting execution of processing. The cache memory unit sends a response packet in response to the received request packet. Each internal switch unit monitors the request packet sent from the channel control unit or disk control unit, and judges whether or not the response packet to the request packet has passed through the internal switch unit within a first given time period since the passage of the request packet. In the case where the response packet has not passed through the internal switch unit within the first given time period, the internal switch unit sends a failure notification.

9 Claims, 27 Drawing Sheets

READ REQUEST PACKET

READ COMPLETION PACKET

WRITE REQUEST PACKET

| DESTINATION TYPE | CACHE MEMORY UNIT 7 | SHARED MEMORY UNIT 8 | FM CACHE MEMORY UNIT 70 | CHANNEL CONTROL UNIT 4 | DISK CONTROL UNIT 5 | OTHER MODULES |
|---|---|---|---|---|---|---|
| TIMEOUT VALUE | 50 | 25 | 100 | 38 | 38 | 200 |

2011, 2012, 2010

CONNECTED COMPONENT TYPE TOV TABLE

FIG. 26

| PORT NUMBER | 0 | 1 | 2 | 3 | 4 | ... |
|---|---|---|---|---|---|---|
| TIMEOUT VALUE | 50 | 25 | 38 | 38 | 100 | |

2021, 2022, 2020

INTERNAL SWITCH UNIT TOV TABLE

FIG. 27

| | INTRA MODULE ACCESS | | | | | INTER MODULE ACCESS | | | | |
|---|---|---|---|---|---|---|---|---|---|---|
| DESTINATION TYPE (2031) | CACHE MEMORY UNIT 7 | SHARED MEMORY UNIT 8 | FM CACHE MEMORY UNIT 70 | CACHE MEMORY UNIT 7 | DISK CONTROL UNIT 5 | CACHE MEMORY UNIT 7 | SHARED MEMORY UNIT 8 | FM CACHE MEMORY UNIT 70 | CACHE MEMORY UNIT 7 | DISK CONTROL UNIT 5 |
| TIMEOUT VALUE (2032) | 100 | 50 | 200 | 76 | 76 | 400 | ~~200~~ 300 | 800 | 304 | 304 |

2030

CHANNEL CONTROL UNIT TOV TABLE

FIG. 28

HIGHLY RELIABLE STORAGE SYSTEM AND INTERNAL NETWORK THEREOF

CLAIM OF PRIORITY

The present application claims priority from Japanese patent application P2006-264147 filed on Sep. 28, 2006, the content of which is hereby incorporated by reference into this application.

BACKGROUND

This invention relates to a storage system, and more particularly, to a technique of identifying a failure component.

Timeout error of a host computer has to be prevented in an information system that has a storage system. This is because timeout error causes an operating system of the host computer to panic, with the result that the entire information system is shut down.

When a storage system is to have such features as high reliability and high availability, it is therefore necessary to avoid timeout error of a host computer and minimize the retry count, as well as to prevent data loss by enhancing the redundancy of data and components.

An example of techniques of avoiding host computer timeout error is disclosed in JP 2002-358170 A. According to the technique disclosed in JP 2002-358170 A, a storage system and a host computer operate in conjunction with each other to avoid timeout error of the host computer.

JP 2001-256003 A discloses a storage system that has redundant components. The storage system disclosed in JP 2001-256003 A duplicates, for redundancy, components including a hard disk drive (HDD), which stores data, a cache memory, and an access path. When a failure occurs in the storage system disclosed in JP 2001-256003 A, a switch is made from a regular component to its substitute component, so data is accessed while bypassing the failure. This enables a host computer to continue processing without running out of time.

There are two types of failure: persistent failure and intermittent failure. A component experiencing persistent failure behaves in the same, wrong way in response to the same access. Intermittent failure, on the other hand, is a failure preceding persistent failure. A component undergoing intermittent failure behaves sometimes rightly and other times wrongly in response to the same access.

The behavior of a component undergoing intermittent failure is thus inconsistent to access made to identify a failure component. As a result, a component where a failure has occurred (failure component) is not always identified successfully in the case of intermittent failure.

JP 2001-94584 A discloses a technique of identifying an intermittent failure component. According to the technique disclosed in JP 2001-94584 A, failure information is collected and a failure component is identified based on the collected failure information.

SUMMARY

However, the technique disclosed in JP 2001-94584 A leaves a possibility that timeout error of a host computer occurs during failure component identification. To avoid host computer timeout error, a highly reliable storage system needs to identify a failure component from one incident of error without making access for identifying a failure component.

This invention has been made in view of the above problems, and it is therefore an object of this invention to provide a storage system that identifies a failure component from one incident of error.

According to an exemplary embodiment of this invention, there is provided a disk controller for controlling read/write of data from/to a disk drive, comprising: a plurality of channel control units coupled to a host computer via channels; a plurality of cache memories for temporarily storing data requested by the host computer to be read/written; a plurality of disk control units coupled to the disk drive; and a plurality of internal switch units which connect the channel control units, the cache memory units, and the disk control units to one another, wherein one of the channel control unit and the disk control unit sends to one of the cache memory units a request packet which requests execution of processing, wherein the cache memory unit receives the request packet from the one of the channel control unit and the disk control unit, wherein the cache memory unit executes the processing that is requested by the received request packet, wherein the cache memory unit sends, in response to the received request packet, a response packet to the one of the channel control unit and the disk control unit, which has sent the request packet, wherein one of the internal switch units monitors the request packet sent from the one of the channel control unit and the disk control unit and the response packet sent from the cache memory unit, wherein the internal switch unit judges whether or not the response packet to the request packet has passed through the internal switch unit within a first given time period since the passage of the request packet, and wherein the internal switch unit sends a failure notification in a case where the response packet has not passed through the internal switch unit within the first given time period.

According to a representative mode of this invention, a storage system can identify a failure component from one incident of error.

BRIEF DESCRIPTION OF THE DRAWINGS

The present invention can be appreciated by the description which follows in conjunction with the following figures, wherein:

FIG. 26 is a configuration diagram of a connected component type timeout value (TOV) table according to the embodiment of this invention;

FIG. 27 is a configuration diagram of the internal switch unit timeout value (TOV) table which is stored in the internal switch unit according to the embodiment of this invention;

FIG. 28 is a configuration diagram of a channel control unit timeout value (TOV) table which is stored in the channel control unit according to the embodiment of this invention;

DETAILED DESCRIPTION OF THE PREFERRED EMBODIMENTS

An embodiment of this invention will be described below with reference to the accompanying drawings.

The premise in this embodiment is that no more than one failure occurs at a time. Importance is put on early disabling of a failed component in this embodiment.

Figure 1:
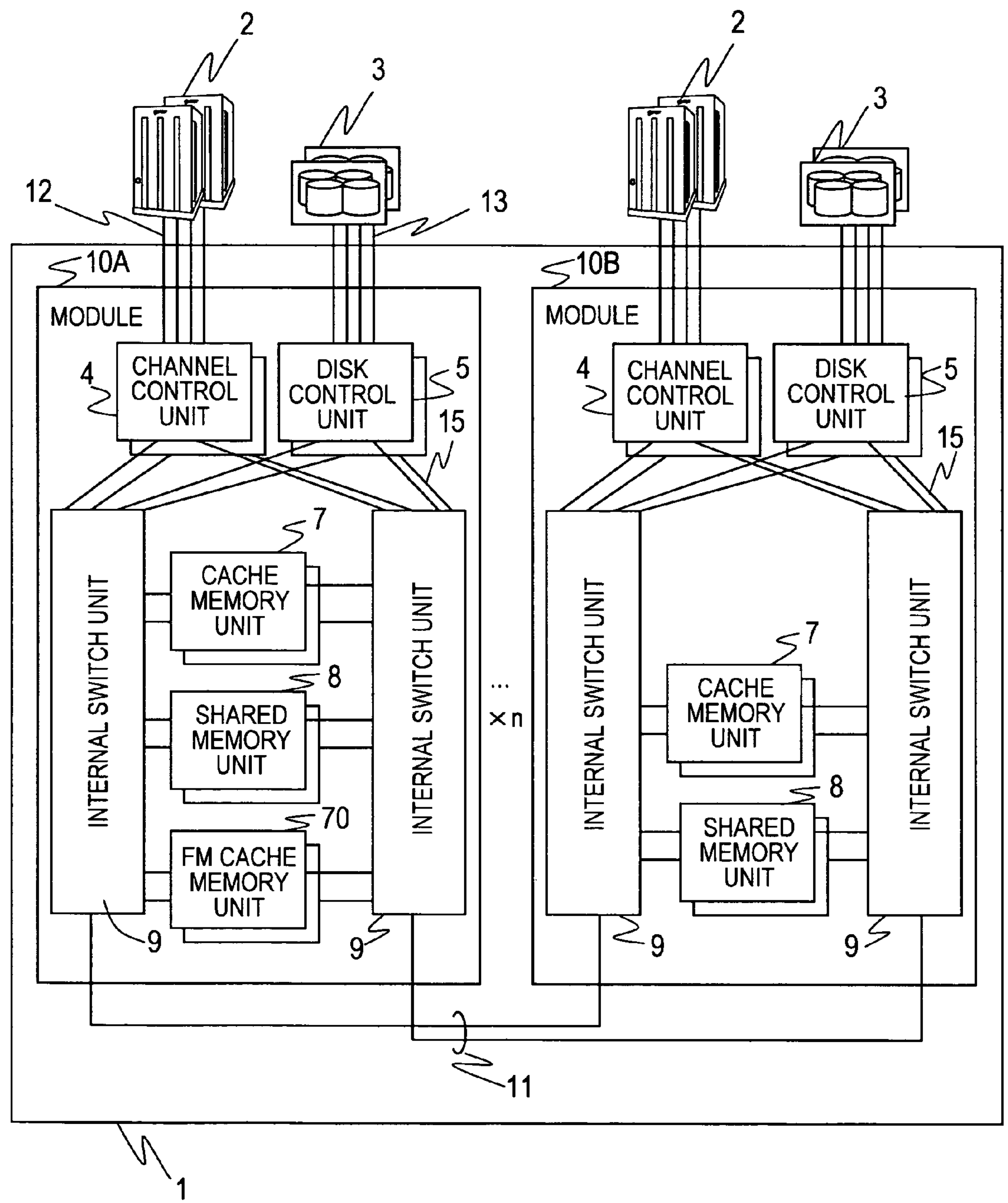
FIG. 1 is a block diagram of the configuration of a computer system according to the embodiment of this invention.

FIG. 1 is a block diagram of the configuration of a computer system according to the embodiment of this invention.

The computer system contains a storage system and a host computer 2. The host computer 2 has a processor, a memory, and an interface.

The storage system has a disk controller 1 and one or more hard disk drives (HDDs) 3.

The disk controller 1 and the host computer 2 are connected to each other via a channel 12. The disk controller 1 and the HDD 3 are connected to each other via an HDD channel 13. Employed for the channel 12 and the HDD channel 13 are, for example, small computer system interfaces (SCSIs) or fibre channels (FCs). Alternatively, the disk controller 1 and the host computer 2 may be connected to each other via a storage area network (SAN) composed of an FC, or the like.

The disk controller 1 exchanges data with the HDD 3 to which it is connected via the HDD channel 13.

For instance, the disk controller 1 receives a read request from the host computer 2 and reads data out of the HDD 3 in accordance with the received read request. The disk controller 1 also receives a write request from the host computer 2 and writes data in the HDD 3 in accordance with the received write request.

The disk controller 1 has one or more modules 10. The disk controller 1 in this embodiment has a module 10A and a module 10B, but can have as many modules 10 as necessary. The modules 10 are interconnected via inter module paths 11. This enables one module 10 to access data stored in the HDD 3 to which this module 10 is not connected directly. A plurality of modules 10 and a plurality of HDDs 3 are provided as one storage system to the host computer 2.

Each module 10 has components including a channel control unit 4, a disk control unit 5, a cache memory unit 7, a shared memory unit 8 and an internal switch unit 9.

Those components operate in conjunction with one another to allow the storage system to process access requests received from the host computer 2. The access requests include read requests and write requests.

The channel control unit 4 has a processor and is connected to the host computer 2 via the channel 12. The channel control unit 4 receives an access request from the host computer 2 and sends or receives data requested by the received access request to or from the host computer 2. In this embodiment, the channel control unit 4 identifies a failure component.

The disk control unit 5 has a processor and is connected to the HDD 3 via the HDD channel 13. The disk control unit 5 controls the connected HDD 3 to write in the HDD 3 data stored in the cache memory unit 7. The disk control unit 5 also stores in the cache memory unit 7 data read out of the HDD 3 by controlling the connected HDD 3. Other tasks of the disk control unit 5 include RAID control. For instance, the disk control unit 5 provides the storage area of the HDD 3 as one or more logical units (LUs) to the host computer 2. The disk control unit 5 in this embodiment also identifies a failure component.

The cache memory unit 7 temporarily stores data read out of the HDD 3 and data to be written in the HDD 3. Having the cache memory unit 7, the module 10 is improved in performance of writing in the HDD 3 and reading out of the HDD 3.

Any memory device can be employed for the cache memory unit 7. It is also possible to use memory devices of different types in combination for the cache memory unit 7.

For example, the disk controller 1 may have an FM cache memory unit 70 in addition to the cache memory unit 7. The cache memory unit 7 in this case uses a dynamic random access memory (DRAM) or other similar memory devices whereas a flash memory serves as the memory device of the FM cache memory unit 70. Flash memories are non-volatile memories albeit with considerable latency. The FM cache memory unit 70 therefore does not lose stored data in the event of power outage or the like. The cache memory unit 7, on the other hand, loses data upon power outage unless a battery or the like is provided for backup. In short, the disk controller 1 accomplishes cost reduction and high package density by having the FM cache memory unit 70.

The shared memory unit 8 stores various types of information such as directory information and storage system configuration information. Directory information is information necessary to manage the cache memory unit 7.

The internal switch unit 9 is connected, via an internal path 15, to the channel control unit 4, the disk control unit 5, the cache memory unit 7 and the shared memory unit 8. The internal switch unit 9 thus interconnects the channel control unit 4, the disk control unit 5, the cache memory unit 7 and the shared memory unit 8. The internal switch unit 9 is also connected, via the inter module path 11, to the internal switch unit 9 that is in another module 10.

The channel control unit 4, the disk control unit 5, the cache memory unit 7, the shared memory unit 8 and the internal switch unit 9 are each duplicated for redundancy to enhance the reliability and availability of the storage system. The redundancy enables the storage system to continue to run without losing data from the host computer 2 despite a failure in one component.

The storage system may have semiconductor storage instead of the HDD 3. A flash memory, for example, is employed as a memory device for semiconductor storage.

Described next is how components and access paths in the storage system of this embodiment are duplicated for redundancy.

Figure 2:
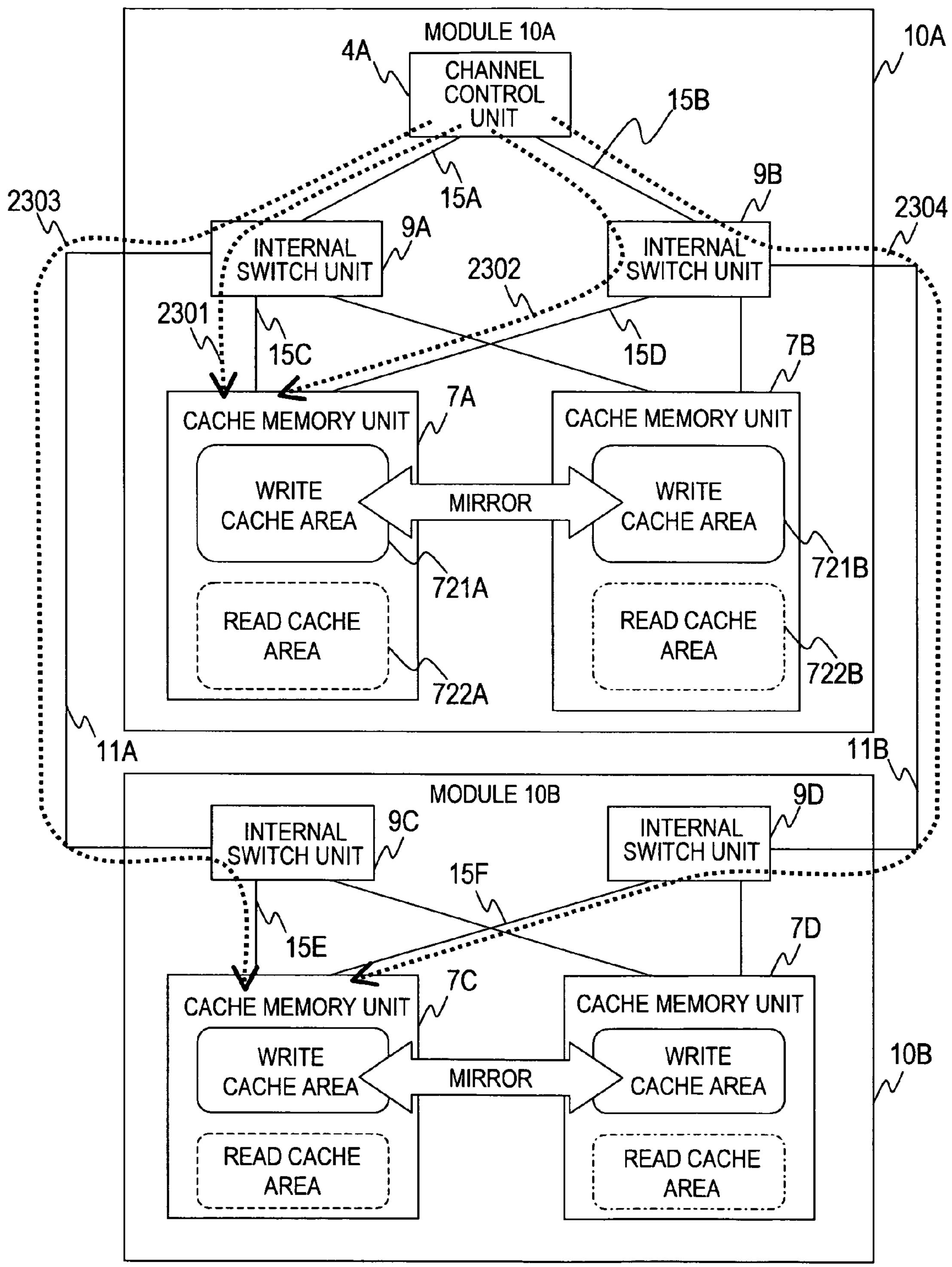
FIG. 2 is an explanatory diagram of how components and access paths are duplicated for redundancy in the storage system according to the embodiment of this invention.

FIG. 2 is an explanatory diagram of how components and access paths are duplicated for redundancy in the storage system according to the embodiment of this invention.

This explanatory diagram illustrates an access path from a channel control unit 4A in the module 10A to a cache memory unit 7C in the module 10B.

The module 10A has the channel control unit 4A, internal switch units 9A and 9B, and cache memory units 7A and 7B. The module 10B has the internal switch units 9C and 9D, the cache memory unit 7C, and a cache memory unit 7D. Some of components in the modules 10A and 10B that are irrelevant to access from the channel control unit 4A to the cache memory unit 7C are omitted from this explanatory diagram.

The cache memory units 7 contain a write cache area 721 and a read cache area 722.

The read cache area 722 temporarily stores data requested by the host computer 2 to be read (read data). Duplicates of the read cache area 721 may or may not be created for redundancy in the plurality of cache memory units 7. This is because read data is stored in the HDDs 3 duplicated for redundancy through RAID control.

The write cache area 721 temporarily stores data requested by the host computer 2 to be written (write data).

Write data is stored in the plurality of cache memory units 7. In other words, duplicates of the write cache area 721 are created for redundancy in the plurality of cache memory units 7. In this explanatory diagram, the write cache area 721 is duplicated such that the cache memory unit 7A and the cache memory unit 7B each have one. Duplication of the write cache area 721 is accomplished by having the channel control unit 4A store the same write data in the cache memory unit 7A and the cache memory unit 7B both. The cache memory unit 7C and the cache memory unit 7D in this explanatory diagram also have one duplicate of the write cache area 721 each.

A failure in one of the cache memory units 7 is thus prevented from causing the loss of write data. However, write data is lost when a failure occurs in one of the cache memory units 7 while the other cache memory unit 7 is experiencing a failure.

A failure in one of the cache memory units 7 results in a reduction in size of the read cache area 722 in the other cache memory unit 7. The reduction thus lowers the processing performance (throughput performance) of the storage system. Those problems arise not only when a failure occurs in the cache memory unit 7 itself but also when a failure in an access path makes the cache memory unit 7 inaccessible.

The storage system therefore should avoid such the situation as much as possible that makes even one access path unusable to access the cache memory unit 7. Accordingly, access paths in addition to components are duplicated for redundancy in this embodiment.

For instance, the channel control unit 4A in the module 10A uses either an access path 2301 or an access path 2302 to access the cache memory unit 7A in the module 10A. The access path 2301 runs through an internal path 15A, the internal switch unit 9A and an internal path 15C. The access path 2302 runs through an internal path 15B, the internal switch unit 9B and an internal path 15D.

The channel control unit 4A in the module 10 uses either an access path 2303 or an access path 2304 to access the cache memory unit 7C in the module 10B. The access path 2303 runs through the internal path 15A, the internal switch unit 9A, an inter module path 11A, the internal switch unit 9C and an internal path 15E. The access path 2304 runs through the internal path 15B, the internal switch unit 9B, an inter module path 11B, the internal switch unit 9D and an internal path 15F. As this, an access path connecting two different modules, too, is duplicated for redundancy.

Figure 3:
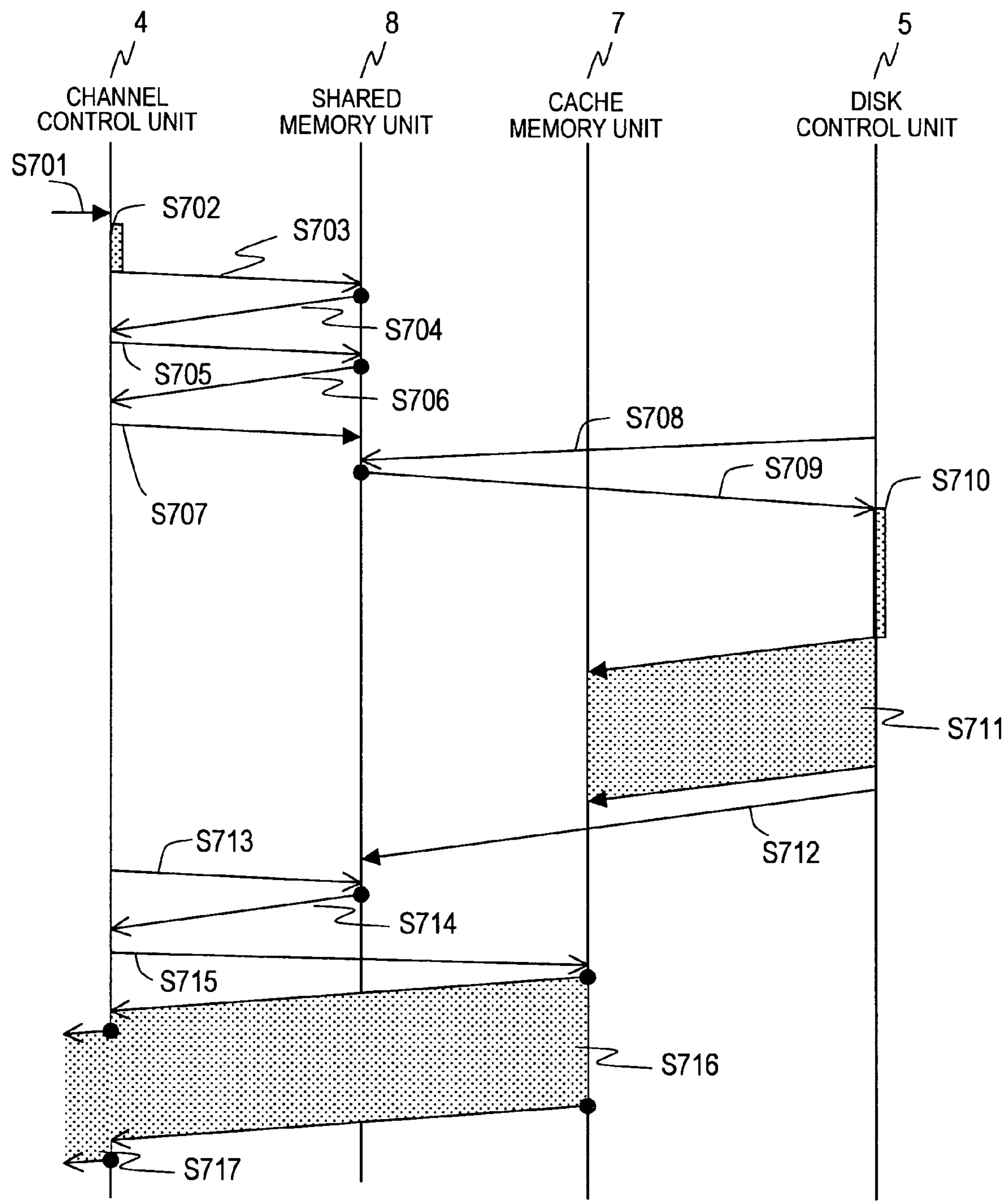
FIG. 3 is a sequence diagram of processing that is executed by the disk controller upon receiving a read request from the host computer according to the embodiment of this invention.

FIG. 3 is a sequence diagram of processing that is executed by the disk controller 1 upon receiving a read request from the host computer 2 according to the embodiment of this invention.

The channel control unit 4 receives a read request from the host computer 2 via the channel 12 (S701). The channel control unit 4A analyzes the received read request to identify the number of an LU out of which the requested data is to be read (LUN) and the address of a block out of which the requested data is to be read (target block address) (S702).

Next, the channel control unit 4 accesses directory information stored in the shared memory unit 8. Referring to the accessed directory information, the channel control unit 4 judges whether or not data requested to be read (read data) is in the cache memory unit 7 (S703 and S704). In FIG. 3, the channel control unit 4 accesses the shared memory unit 8 only once in order to judge whether the read data is in the cache memory unit 7 or not, but the channel control unit 4 may access the shared memory unit 8 more than once.

In a case where the read data is in the cache memory unit 7, the channel control unit 4 obtains the read data from the cache memory unit 7 (S715 and S716). The channel control unit 4 sends the obtained read data to the host computer 2 (S717).

In a case where the read data is not in the cache memory unit 7, the channel control unit 4 accesses directory information stored in the shared memory unit 8. Referring to the accessed directory information, the channel control unit 4 judges whether or not the cache memory unit 7 has a free area in which the read data can be stored (S705 and S706). When there is no free area that meets the condition, the channel control unit 4 creates a free area in the cache memory unit 7.

When a free area is found or created, the channel control unit 4 writes a message in a communication area of the shared memory unit 8, to thereby issue a staging request to the disk control unit 5 (S707). The staging request is for requesting the disk control unit 5 to transfer the read data to the free area in the cache memory unit 7.

The disk control unit 5 reads the communication area of the shared memory unit 8 regularly or each time a series of processing is completed. The disk control unit 5 thus receives the staging request and other messages issued by the channel control unit 4.

In this manner, the channel control unit 4 and the disk control unit 5 cooperate with each other using the communication area of the shared memory unit 8. The communication area of the shared memory unit 8 is used since the disk control unit 5 reads data out of the HDD 3 at random intervals and this reading processing takes long compared to other processing. In short, the use of the communication area in the shared memory unit 8 allows the channel control unit 4 and the disk control unit 5 to perform other processing on the background.

The disk control unit 5 here receives the staging request by reading the communication area of the shared memory unit 8 (S708 and S709). The disk control unit 5 then controls the HDD 3 via the HDD channel 13 to obtain the read data from the HDD 3 (S710).

The disk control unit 5 stores (performs staging) the obtained read data in (to) the free area of the cache memory unit 7 (S711). The disk control unit 5 then writes a message in the communication area of the shared memory unit 8 to notify the channel control unit 4 of the completion of the staging (S712).

Like the disk control unit 5, the channel control unit 4 reads the communication area of the shared memory unit 8 regularly or each time a series of processing is completed. The channel control unit 4 thus receives the staging completion notification and other messages from the disk control unit 5.

The channel control unit 4 here receives the staging completion notification by reading the communication area of the shared memory unit 8 (S713 and S714). The channel control unit 4 then sets a transfer list and obtains the read data from the cache memory unit 7 (S715 and S716). The channel control unit 4 transfers the obtained read data to the host computer 2 (S717).

In the manner described above, the disk controller 1 processes a read request received from the host computer 2. The disk controller 1 does not access the HDD 3 when requested read data is in the cache memory unit 7. This enables the disk controller 1 to process read requests quickly.

The disk controller 1 processes write requests received from the host computer 2 in a manner similar to the way read requests are processed. Specifically, the disk controller 1 stores data requested to be written (write data) in the cache memory unit 7, and at this point, informs the host computer 2 of write completion in response to a write request. This means that the disk controller 1 can inform the host computer 2 of write completion without storing write data in the HDD 3. The disk controller 1 can thus process write requests quickly.

The description given next is about packets that are used within the disk controller 1.

Figure 4:
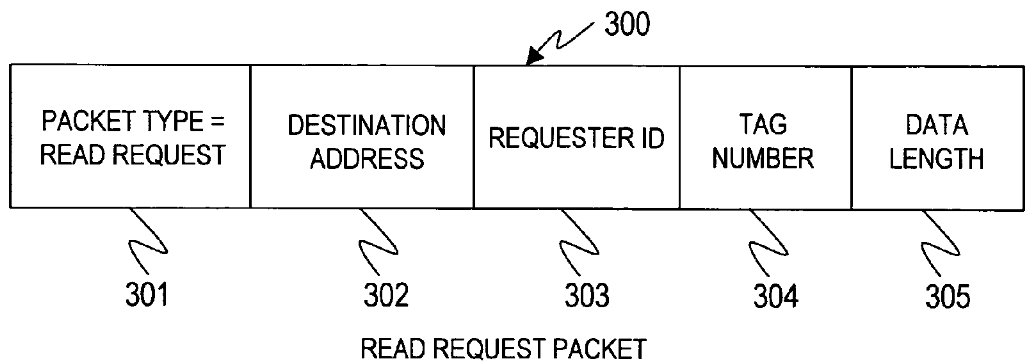
FIG. 4 is a data structure diagram of a read request packet according to the embodiment of this invention.

FIG. 4 is a data structure diagram of a read request packet 300 according to the embodiment of this invention.

The read request packet 300 is a packet for requesting data read. The read request packet 300 is issued when, for example, the channel control unit 4 or the disk control unit 5 reads data out of the cache memory unit 7.

A component that issues a request packet is called a requester. A component to which a request packet is sent is called a completer.

The read request packet 300 contains a packet type 301, a destination address 302, a requester ID 303, a tag number 304, and a data length 305.

The packet type 301 indicates the type of this packet. Since it is the read request packet 300 that is described here, the packet type 301 indicates the read request packet 300.

The destination address 302 indicates a location where data requested by this read request packet 300 to be read is stored. The destination address 302 contains, for example, the identifier of the cache memory unit 7 and an address for identifying a storage area in this cache memory unit 7.

The requester ID 303 indicates an identifier unique to a component that has issued this read request packet 300 (requester). For instance, when it is the channel control unit 10A that has issued the read request packet 300, an identifier unique to the channel control unit 10A is held as the requester ID 303.

The tag number 304 indicates an identifier for identifying this read request packet 300 from among packets that are issued by the requester identified by the requester ID 303. For instance, a requester adds 1 to the tag number of the preceding packet each time it issues a new packet. In other words, the read request packet 300 is identified by the combination of the requester ID 303 and the tag number 304.

The data length 305 indicates the size of data requested by this read request packet 300 to be read.

Figure 5:
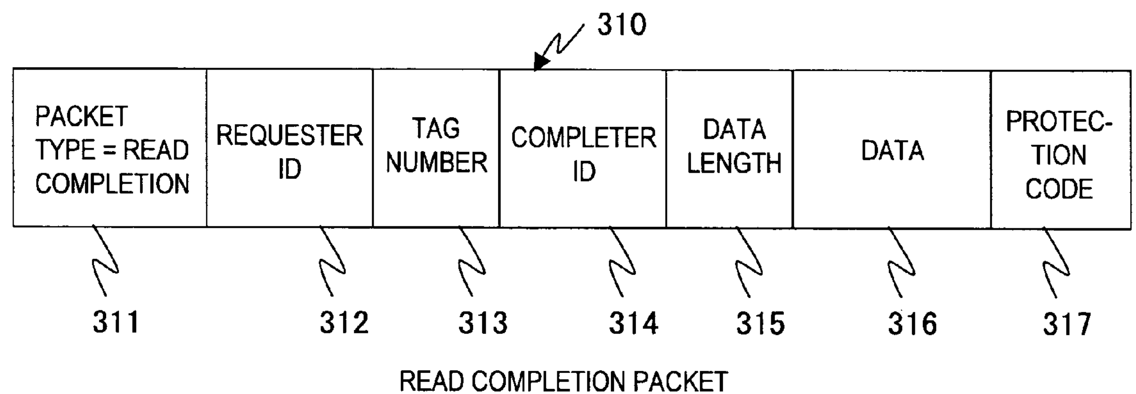
FIG. 5 is a data structure diagram of a read completion packet according to the embodiment of this invention.

FIG. 5 is a data structure diagram of a read completion packet 310 according to the embodiment of this invention.

The read completion packet 310 is a packet for sending data that is requested by the read request packet 300 to be read. The read completion packet 310 is issued when, for example, the cache memory unit 7 sends data requested by the read request packet 300 to be read.

The read completion packet 310 contains a packet type 311, a requester ID 312, a tag number 313, a completer ID 314, a data length 315, data 316, and a protection code 317.

The packet type 311 indicates the type of this packet. Since it is the read completion packet 310 that is described here, the packet type 311 indicates the read completion packet 310.

The requester ID 312 indicates an identifier unique to a component that has issued the read request packet 300 associated with this read completion packet 310. In short, the same value is held as the requester ID 303 of one read request packet 300 and as the requester ID 312 of the read completion packet 310 that is associated with this read request packet 300.

The tag number 313 indicates an identifier for identifying the read request packet 300 associated with this read completion packet 310 from among packets that are issued by the component identified by the requester ID 312. In short, the same value is held as the tag number 304 of one read request packet 300 and as the tag number 313 of the read completion packet 310 that is associated with this read request packet 300.

The completer ID 314 indicates an identifier unique to a component that has issued this read completion packet 310. The component that has issued the read completion packet 310 has received the read request packet 300, which makes the component a completer.

The data length 315 indicates the size of the data 316 of this read completion packet 310. Therefore, the same value is held as the data length 305 of one read request packet 300 and the data length 315 of the read completion packet 310 that is associated with this read request packet 300.

The data 316 indicates data requested by the read request packet 300 that is associated with this read completion packet 310 to be read.

The protection code 317 indicates a code used to check the validity of the data 316 of this read completion packet 310. The protection code 317 is, for example, a CRC value.

A completer receives the read request packet 300 from a requester. The completer sends the read completion packet 310 that contains the data 316 requested by the received read request packet 300 to be read to the requester over the same path (access path) that has been used in transmission of the read request packet 300.

Figure 6:
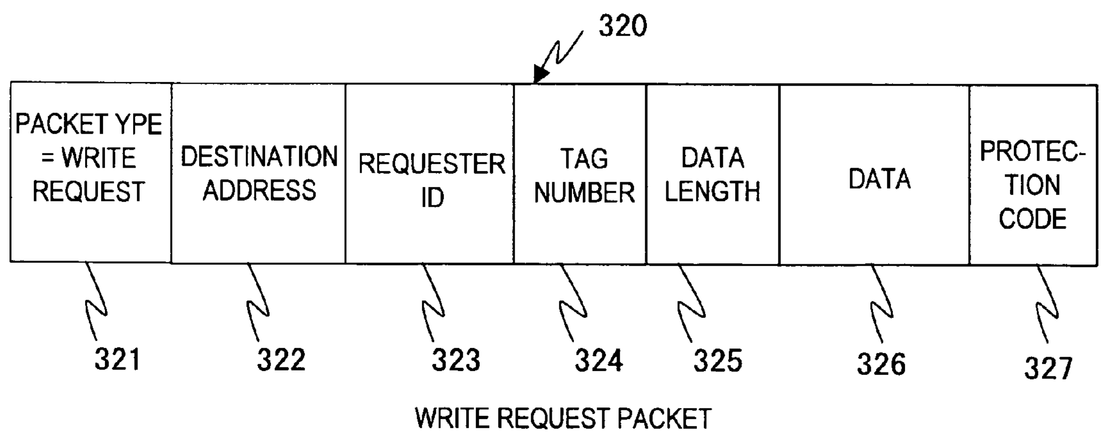
FIG. 6 is a data structure diagram of a write request packet according to the embodiment of this invention.

FIG. 6 is a data structure diagram of a write request packet 320 according to the embodiment of this invention.

The write request packet 320 is a packet for requesting data write. The write request packet 320 is issued when, for example, the channel control unit 4 or the disk control unit 5 writes data in the cache memory unit 7.

The write request packet 320 contains a packet type 321, a destination address 322, requester ID 323, a tag number 324, a data length 325, data 326, and a protection code 327.

The packet type 321 indicates the type of this packet. Since it is the write request packet 320 that is described here, the packet type 321 indicates the write request packet 320.

The destination address 322 indicates a location where data requested by this write request packet 320 to be written is going to be stored. The destination address 322 contains, for example, the identifier of the cache memory unit 7 and the identifier of a storage area in this cache memory unit 7.

The requester ID 323 indicates an identifier unique to a component (requester) that has issued this write request packet 320. For instance, when it is the channel control unit 10A that has issued the write request packet 320, an identifier unique to the channel control unit 10A is held as the requester ID 323.

The tag number 324 indicates an identifier for identifying this write request packet 320 from among packets that are issued by the requester identified by the requester ID 323. For instance, a requester adds 1 to the tag number of the preceding packet each time it issues a new packet. In other words, the write request packet 320 is identified by the combination of the requester ID 323 and the tag number 324.

The data length 325 indicates the size of data requested by this write request packet 320 to be written. In other words, the data length 325 indicates the size of the data 326 of this write request packet 320.

The data 326 indicates data requested by this write request packet 320 to be written. The protection code 327 indicates a code used to check the validity of the data 326 of this write request packet 320.

Figure 7:
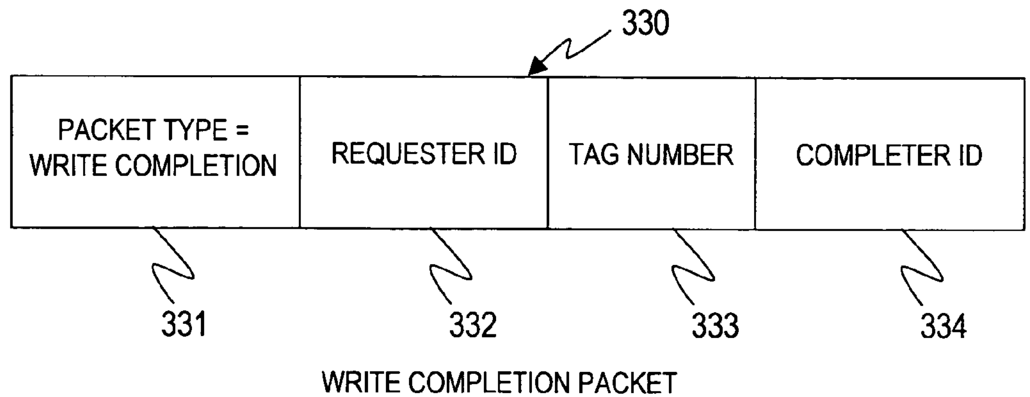
FIG. 7 is a data structure diagram of a write completion packet according to the embodiment of this invention.

FIG. 7 is a data structure diagram of a write completion packet 330 according to the embodiment of this invention.

The write completion packet 330 is a packet for notifying completion of writing data that has been requested by the write request packet 320. The write completion packet 330 is issued when, for example, the cache memory unit 7 finishes writing data requested by the write request packet 320.

The write completion packet 330 contains a packet type 331, a requester ID 332, a tag number 333, and a completer ID 334.

The packet type 331 indicates the type of this packet. Since it is the write completion packet 330 that is described here, the packet type 331 indicates the write completion packet 330.

The requester ID 332 indicates an identifier unique to a component that has issued the write request packet 320 associated with this write completion packet 330. In short, the same value is held as the requester ID 323 of one write request packet 320 and as the requester ID 332 of the write completion packet 330 that is associated with this write request packet 320.

The tag number 333 indicates an identifier for identifying the write request packet 320 associated with this write completion packet 330 from among packets that are issued by the component identified by the requester ID 332. In short, the same value is held as the tag number 324 of one write request packet 320 and as the tag number 333 of the write completion packet 330 that is associated with this write request packet 320.

The completer ID 334 indicates an identifier unique to a component that has issued this write completion packet 330. The component that has issued the write completion packet 330 has received the write request packet 320, which makes the component a completer.

A completer receives the write request packet 320 from a requester and writes the data 326 contained in the received write request packet 320. Finishing writing the data 326, the completer sends the write completion packet 330 to the requester over the same path (access path) that has been used in transmission of the write request packet 320.

Figure 8:
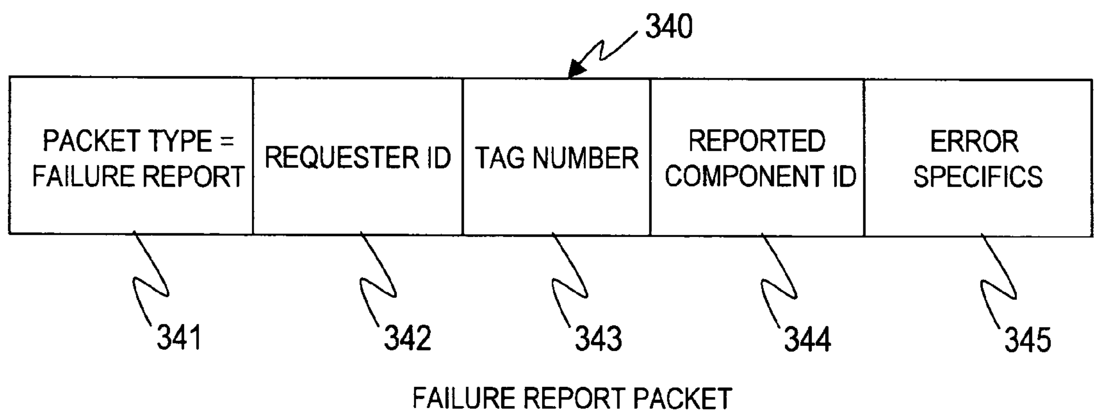
FIG. 8 is a data structure diagram of a failure report packet according to the embodiment of this invention.

FIG. 8 is a data structure diagram of a failure report packet 340 according to the embodiment of this invention.

The failure report packet 340 is a packet for notifying a failure. The failure report packet 340 is issued when, for example, a failure is detected as data requested by the write request packet 320 is written in the cache memory unit 7.

The failure report packet 340 contains a packet type 341, a requester ID 342, a tag number 343, a reporter component ID 344 and error specifics 345.

The packet type 341 indicates the type of a packet in this packet. Since it is the failure report packet 340 that is described here, the packet type 341 indicates the failure report packet 340.

The requester ID 342 indicates an identifier unique to a component that is the issuer of the read request packet 300 or the write request packet 320 undergoing processing prior to the detection of the failure. In other words, the requester ID 342 of the failure report packet 340 holds the same value as the requester ID 303 of the read request packet 300 with which the failure report packet 340 is associated, or the same value as the requester ID 323 of the write request packet 320 with which the failure report packet 340 is associated.

The tag number 343 indicates an identifier for identifying the read request packet 300 or the write request packet 320 whose processing has been in progress prior to failure detection from among packets that are issued by the component identified by the requester ID 342. In other words, the tag number 343 of the failure report packet 340 holds the same value as the tag number 304 of the read request packet 300 with which the failure report packet 340 is associated, or the same value as the tag number 324 of the write request packet 320 with which the failure report packet 340 is associated.

The reporter component ID 344 indicates an identifier unique to a component that has issued this failure report packet 340.

The error specifics 345 indicate what kind of failure is notified by this failure report packet 340. For instance, the error specifics 345 indicate that the reported failure is timeout error or link error.

A completer receives the read request packet 300 or the write request packet 320 from a requester, and processes the received read request packet 300 or write request packet 320. In a case where a failure is detected by the completer during the processing, the completer sends the failure report packet 340 to the requester over the same path (access path) that has been used in transmission of the received read request packet 300 or write request packet 320.

Figure 9:
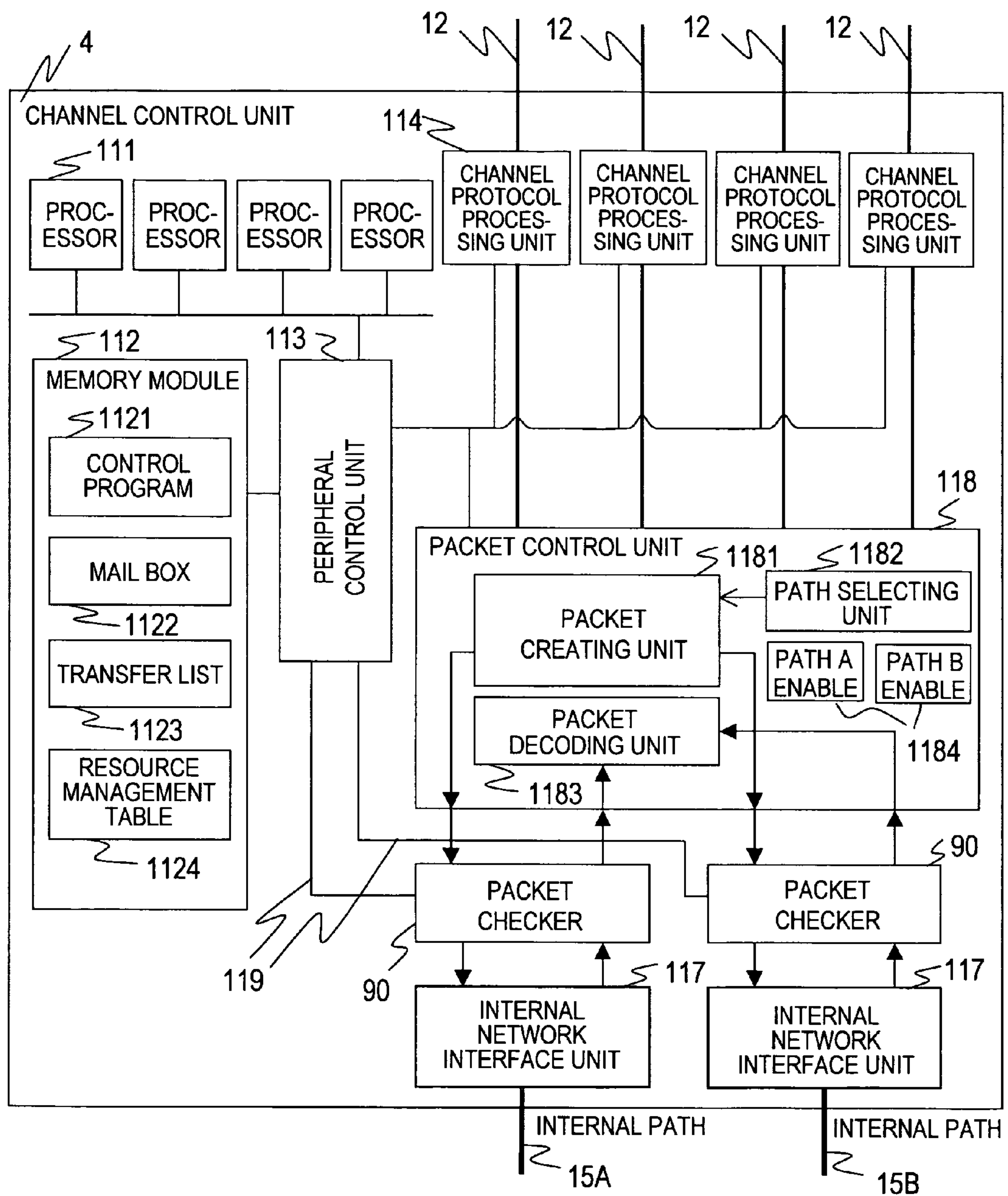
FIG. 9 is a block diagram of the configuration of the channel control unit in the module according to the embodiment of this invention.

FIG. 9 is a block diagram of the configuration of the channel control unit 4 in the module 10 according to the embodiment of this invention.

The channel control unit 4 has one or more processors 111, one or more memory modules 112, one or more peripheral control units 113, one or more channel protocol processing units 114, one or more internal network interface units 117, one or more packet control units 118 and one or more packet checkers 90.

The peripheral control unit 113 is connected via a bus or the like to the processor 111, the memory module 112 and the channel protocol processing units 114. The peripheral control unit 113 controls the connected memory module 112. The peripheral control unit 113 is also connected to the packet checker 90 via a failure report signal line 119.

The peripheral control unit 113 receives packets from the processor 111, the channel protocol processing unit 114 and the internal network interface unit 117. The peripheral control unit 113 judges whether or not the destination address of a received packet indicates the memory module 112. When the memory module 112 is indicated by the destination address of the packet, the peripheral control unit 113 carries out processing requested by the received packet. The peripheral control unit 113 sends data if the requested processing requires it to do so.

When the destination address of the packet indicates other components than the memory module 112, the peripheral control unit 113 transfers the received packet to a component at the destination address of the received packet.

The processor 111 accesses the memory module 112 via the peripheral control unit 113. The processor 111 executes a control program 1121, which is stored in the memory module 112, to perform various types of processing. FIG. 9 shows four processors 111, but the channel control unit 4 can have as many processors 111 as necessary.

The memory module 112 stores a program executed by the processor 111, information needed by the processor 111, and the like. Specifically, the memory module 112 stores the control program 1121, a mail box 1122, a transfer list 1123 and a resource management table 1124.

The control program 1121 is a program executed by the processor 111 and performs overall control of the channel control unit 4. The mail box 1122 is a storage area used by the plurality of processors 111 to communicate with one another. The transfer list 1123 is information that allows the channel protocol processing unit 114 to perform a direct memory access (DMA). Specifically, the transfer list 1123 is a list of addresses in the cache memory unit 7.

The resource management table 1124 shows the state of the respective components including the cache memory unit 7. The processor 111 judges whether or not a component is accessible based on the resource management table 1124.

The channel protocol processing unit 114 controls the protocol of the channel 12. Specifically, the channel protocol processing unit 114 converts a protocol outside the storage system 1 and a protocol inside the storage system 1 from one to the other.

For instance, when receiving a read request from the host computer 2 via the channel 12, the channel protocol processing unit 114 analyzes the received read request to identify the identifier of the host computer 2 from which the read request has been sent, the number of an LU (LUN) out of which the requested data is to be read, and the address of a block (target block address) out of which the requested data is to be read. The channel protocol processing unit 114 sends the identified host computer identifier, LUN, and target block address to the processor 111.

Receiving the information from the channel protocol processing unit 114, the processor 111 accesses directory information stored in the shared memory unit 8. The processor 111 thus judges whether or not data (read data) requested by the read request to be read is in the cache memory unit 7.

In a case where the read data is in the cache memory unit 7, the processor 111 creates the transfer list 1123 and stores the list in the memory module 112. Based on the created transfer list 1123, the channel protocol processing unit 114 transfers the read data in the cache memory unit 7 to the host computer 2.

In a case where the read data is not in the cache memory unit 7, on the other hand, the processor 111 requests the disk control unit 5 to perform staging of the read data. Receiving the request, the disk control unit 5 stores in the cache memory unit 7 the read data stored in the HDD 3. The processor 111 then creates the transfer list 1123 and stores the list in the memory module 112. Based on the created transfer list 1123, the channel protocol processing unit 114 transfers the read data in the cache memory unit 7 to the host computer 2.

When receiving a write request from the host computer 2 via the channel 12, the channel protocol processing unit 114 analyzes the received write request to identify the identifier of the host computer 2 from which the write request has been sent, the number of an LU (LUN) in which the requested data is to be written, and the address of a block (target block address) in which the requested data is to be written. The channel protocol processing unit 114 sends the identified host computer identifier, LUN, and target block address to the processor 111.

Receiving the information from the channel protocol processing unit 114, the processor 111 accesses directory information stored in the shared memory unit 8. The processor 111 thus judges whether or not the cache memory unit 7 has a write data area, namely, a storage area (write area) in which data (write data) requested by the write request to be written is to be stored.

When the write area is in the cache memory unit 7, the processor 111 creates the transfer list 1123 and stores the list in the memory module 112. Based on the created transfer list 1123, the channel protocol processing unit 114 transfers the write data to the cache memory unit 7.

When the write area is not in the cache memory unit 7, on the other hand, the processor 111 requests the disk control unit 5 to perform destaging. The disk control unit 5 performs destaging to create the write area in the cache memory unit 7. The processor 111 then creates the transfer list 1123 and stores the list in the memory module 112. Based on the created transfer list 1123, the channel protocol processing unit 114 transfers the write data to the cache memory unit 7.

The internal network interface unit 117 is an interface connected to the internal switch unit 9 via the internal path 15.

The internal network interface unit 117 executes, for example, parallel-serial or other types of signal conversion, physical voltage conversion, and a protocol.

The packet control unit 118 has a packet creating unit 1181, a path selecting unit 1182, a packet decoding unit 1183 and a path state register 1184.

The path state register 1184 shows whether the respective internal paths 15 are usable or not.

The packet creating unit 1181 creates a packet in response to a packet creating request sent from the processor 111 or the channel protocol processing unit 114.

The path selecting unit 1182 chooses a path to use for transmission of the created packet in accordance with the packet creating request and the path state register 1184. Specifically, the path selecting unit 1182 does not choose the internal path 15 that is unusable according to the path state register 1184. In other words, the path selecting unit 1182 chooses over which internal path 15 the created packet is to be transmitted from among the internal paths 15 that are usable according to the path state register 1184.

For instance, the path selecting unit 1182 may choose the internal path 15 where the traffic is light from among the internal paths 15 that are usable according to the path state register 1184, or may choose the usable internal paths 15 one by one using a round robin algorithm or the like.

The path selecting unit 1182 notifies the packet creating unit 1181 of the chosen internal path 15. The packet creating unit 1181 sends the created packet to the packet checker 90 that is connected to the notified internal path 15.

The packet decoding unit 1183 receives the packet from the packet checker 90. The packet decoding unit 1183 interprets the received packet and converts the received packet into a format that can be processed by the processor 111 or the channel protocol processing unit 114.

The packet decoding unit 1183 also receives the failure report packet 340 and notifies the processor 111 of the failure via the failure report signal line 119. To notify the processor 111 of a failure, the packet decoding unit 1183 uses interruption or other measures. Processing (failure handling) that the processor 111 executes when notified of a failure will be described in detail with reference to FIG. 17.

The packet checker 90 performs timer monitoring while taking into account the association between the request packet 300 and the completion packet 310 or the association between the request packet 320 and the completion packet 330. The packet checker 90 thus detects a failure in a component. Details of the packet checker 90 will be described with reference to FIG. 14.

The disk control unit 5 has the same configuration as the channel control unit 4, but contains a different control program 1121 than the one in the channel control unit 4. Another difference is that the channel protocol processing unit 114 in the disk control unit 5 communicates with a hard disk drive 50 instead of the host computer 2. The channel 12 and the HDD channel 13 may employ the same protocol or different protocols.

The channel protocol processing unit 114 in the disk control unit 5 controls the protocol of the HDD channel 13.

The processor 111 in the disk control unit 5 stores in the HDD 3 data stored in the cache memory unit 7 at regular intervals. Alternatively, the processor 111 in the disk control unit 5 may store in the HDD 3 data stored in the cache memory unit 7 upon request from the channel control unit 4.

When receiving a staging request from the channel control unit 4, the processor 111 in the disk control unit 5 reads data out of the hard disk drive 50. The processor 111 in the disk control unit 5 writes the read data in the cache memory unit 7.

When receiving a destaging request from the channel control unit 4, the processor 111 in the disk control unit 5 creates in the cache memory unit 7 a storage area in which write data is to be stored. Specifically, the processor 111 in the disk control unit 5 returns data in the cache memory unit 7 to the HDD 3, thereby creating in the cache memory unit 7 a storage area in which write data is to be stored.

The processor 111 in the disk control unit 5 also performs RAID control on the HDD 3 in order to improve the availability and performance of the HDD 3.

Figure 10:
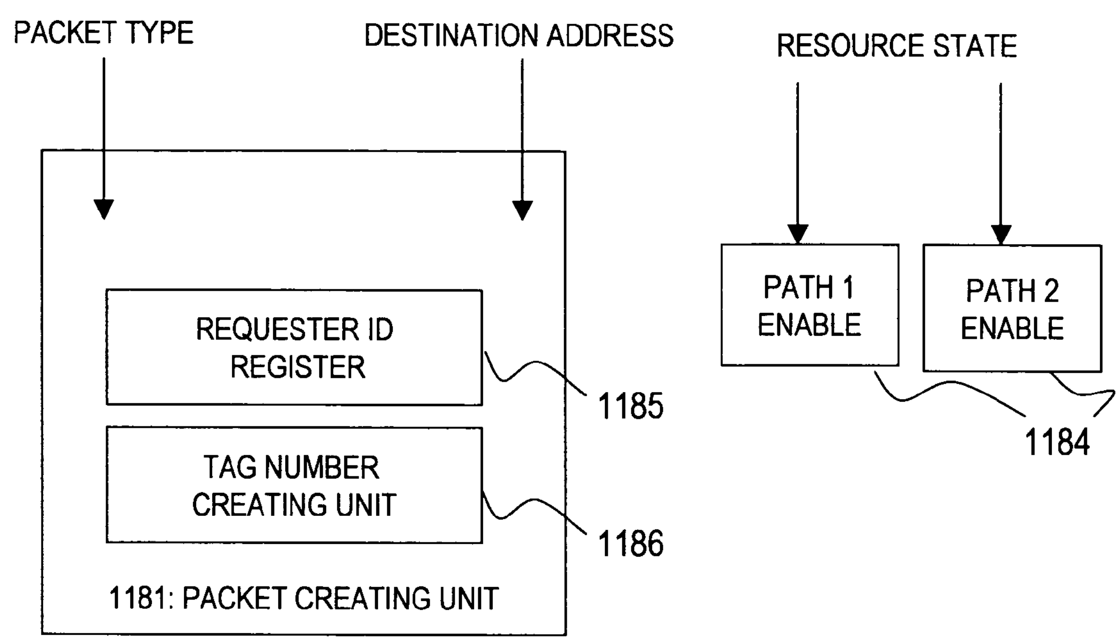
FIG. 10 is an explanatory diagram of the packet creating unit in the channel control unit according to the embodiment of this invention.

FIG. 10 is an explanatory diagram of the packet creating unit 1181 in the channel control unit 4 according to the embodiment of this invention.

The packet creating unit 1181 contains a requester ID register 1185 and a tag number creating unit 1186. The requester ID register 1185 stores an identifier (requester ID) unique to the channel control unit 4 that has this requester ID register 1185. The requester ID stored in the requester ID register 1185 is determined by at which location the channel control unit 4 that has this requester ID register 1185 is connected.

The tag number creating unit 1186 creates the tag numbers 304 and 324 of the request packets 300 and 320, respectively. Specifically, the tag number creating unit 1186 adds "1" to the tag number 304 or 324 of the precedent request packet 300 or 320, respectively, each time a new request packet 300 or 320 is issued. In a case where the tag number 304 or 324 of the precedent request packet 300 or 320 is the maximum value, respectively, the tag number creating unit 1186 gives the minimum value "0" to the following tag number 304 or 324.

The processor 111 sends a packet creating request to the packet creating unit 1181. A packet creating request contains a packet type and an address to which this packet is sent. The packet type indicates whether the read request packet 300 or the write request packet 310 is requested to be created.

When sending a packet creating request, the processor 111 refers to the resource management table 1124 to set the path state register 1184. Specifically, the processor 111 judges each internal path 15 on whether or not the internal path 15 can be used for transmission of the packet. The processor 1124 stores the judgment in the path state register 1184.

In other words, the path state register 1184 thus shows whether or not the internal path 15 that is associated with this path state register 1184 is usable for packet transmission.

In this explanatory diagram, the internal path 15 and the path state register 1184 are associated on a one-on-one basis. Alternatively, one combination of the internal path 15 and a destination address may be associated with one path state register 1184. The path selecting unit 1182 in this case chooses a path to be used for packet transmission taking also into account the transfer destination address.

The path state register 1184 may be omitted from the channel control unit 4. In this case, the path selecting unit 1182 refers to the resource management table 1124 stored in the memory module 112 in choosing which path to use for packet transmission.

The packet creating unit 1181 receives a packet creating request from the processor 111, and creates a packet in accordance with the received packet creating request packet.

A case where the packet type contained in the received packet creating request indicates the read request packet 300 will be described first. The packet creating unit 1181 in this case creates the read request packet 300.

The packet creating unit 1181 first stores, as the packet type 301 of the read request packet 300, information indicating that it is the read request packet 300. The packet creating unit 1181 next stores, as the destination address 302 of the read request packet 300, a destination address that is contained in the packet creating request.

As the requester ID 303 of the read request packet 300, the packet creating unit 1181 stores a value registered in the requester ID register 1185. Stored as the tag number 304 of the read request packet 300 by the packet creating unit 1181 is a tag number created by the tag number creating unit 1186. The packet creating unit 1181 then stores the size of data requested to be read as the data length 305 of the read request packet 300.

Described next is the case where the packet type contained in the received packet creating request indicates the write request packet 320. The packet creating unit 1181 in this case creates the write request packet 320.

The packet creating unit 1181 first stores, as the packet type 321 of the write request packet 320, information indicating that it is the write request packet 320. The packet creating unit 1181 next stores, as the destination address 322 of the write request packet 320, a destination address contained in the packet creating request.

As the requester ID 323 of the write request packet 320, the packet creating unit 1181 stores a value registered in the requester ID register 1185. Stored as the tag number 324 of the write request packet 320 by the packet creating unit 1181 is a tag number created by the tag number creating unit 1186. The packet creating unit 1181 then stores the size of data requested to be written as the data length 325 of the write request packet 320.

Next, the packet creating unit 1181 stores data requested to be written as the data 326 of the write request 320. As the protection code 327 of the write request packet 320, the packet creating unit 1181 stores a code used to check the validity of data requested to be written.

The packet creating unit 1181 in the disk control unit 5 is the same as the one in the channel control unit 4. A detailed description on the packet creating unit 1181 in the disk control unit 5 is therefore omitted.

Figure 11:
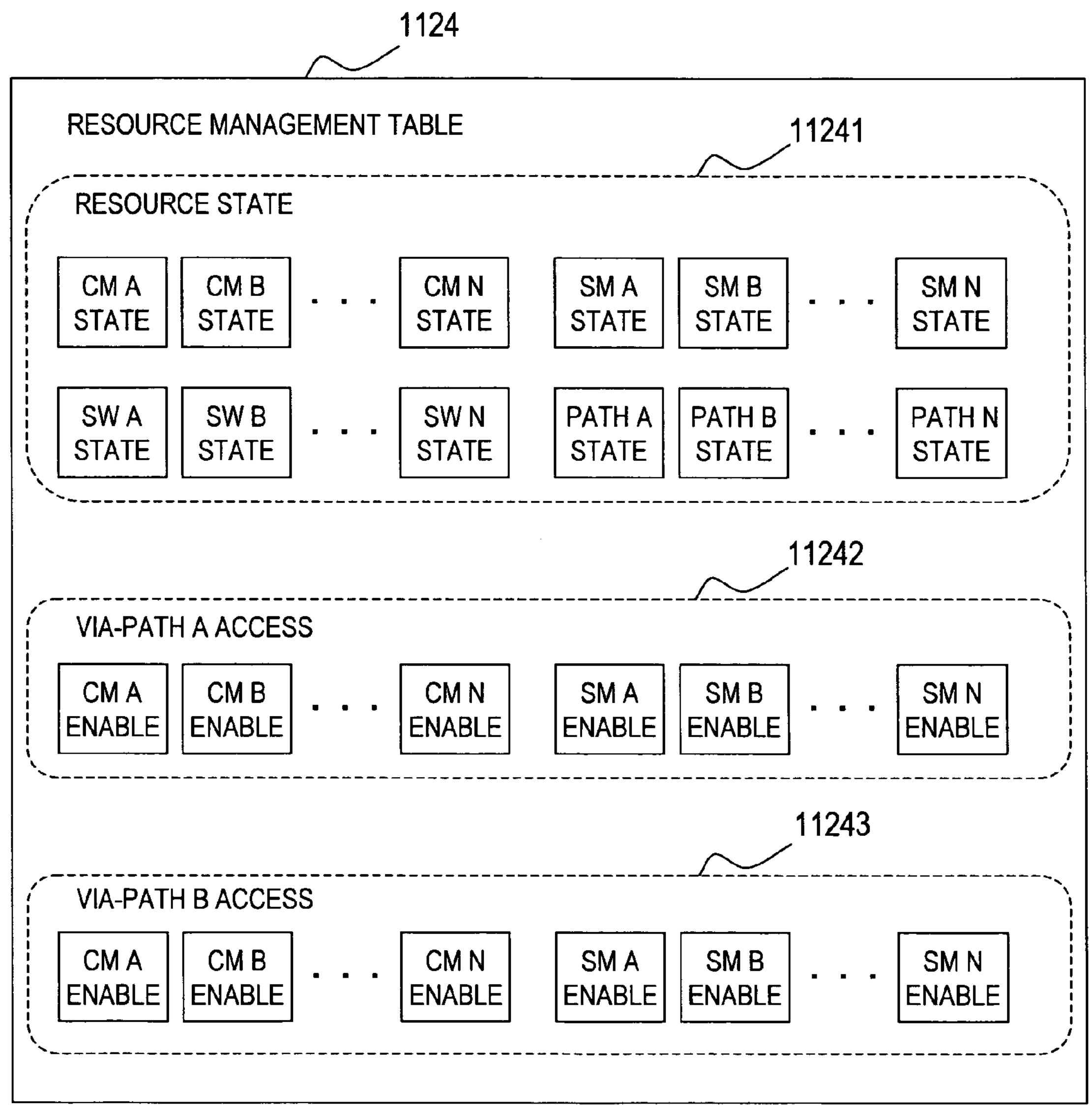
FIG. 11 is an explanatory diagram of the resource management table which is stored in the channel control unit according to the embodiment of this invention.

FIG. 11 is an explanatory diagram of the resource management table 1124 which is stored in the channel control unit 4 according to the embodiment of this invention.

The resource management table 1124 contains a resource state 11241, a via-path A access state 11242 and a via-path B access state 11243.

The resource state 11241 shows the state of the respective components estimated from failure report. Specifically, the resource state 11241 indicates whether or not the respective components are normal. For example, the resource state 11241 indicates that the cache memory unit 7A is normal whereas the cache memory unit 7B is experiencing a failure. Only normal components are used for access since a component experiencing a failure should be avoided.

The via-path A access status 11242 indicates whether or not the components are accessible through the internal path 15A. The via-path B access status 11243 indicates whether or not the components are accessible through the internal path 15B.

For example, in a case where a failure is detected in the internal switch unit 9 that is connected to the internal path 15A, the via-path A state 11242 indicates that none of the components are accessible. If only cases where a failure occurs in the internal switch unit 9 are to be considered, there is no need for the via-path A state 11242 to indicate the accessibility of each component.

In this embodiment where other failures than one in the internal switch unit 9 connected to the internal path 15A are considered, the resource management table 1124 stores a state for each combination of the internal path 15 and a destination component.

When link down is detected, only components that are connected to the link down internal path 15 become inaccessible. In a case where a failure occurs in the internal switch unit 9 of the module 10B, only access through the internal path 15 that is connected to the failed internal switch unit 9 becomes inaccessible.

In this embodiment, a component can be used continuously unless a failure occurs in an accessed component. For example, in the case where a failure occurs in the internal path 15, a component to be accessed can be accessed via other internal paths 15. The storage system can thus keep its reliability high.

The redundancy configuration prevents the storage system from losing data upon failure in any internal path 15 or component, for the storage system only needs to switch from one of two components forming a redundancy pair to the other component so that the latter is accessed instead of the former.

However, it is not desirable to make a switch between the components immediately after the failure occurs. This is because a failure in the other component forming the redundancy pair causes the storage system to shut down. The key to enhance the availability of the storage system is therefore how well the component redundancy can be maintained.

The component redundancy also enables the storage system to balance the load of read access. Switching components in some cases necessitates reconfiguration of data stored in the cache memory unit 7. For instance, since read data stored in the cache memory unit 7 does not have to be duplicated for redundancy, most of read data is discarded when a switch between components is made. Maintaining the component redundancy thus enhances not only the availability of the storage system but also the performance of the storage system.

Figure 12:
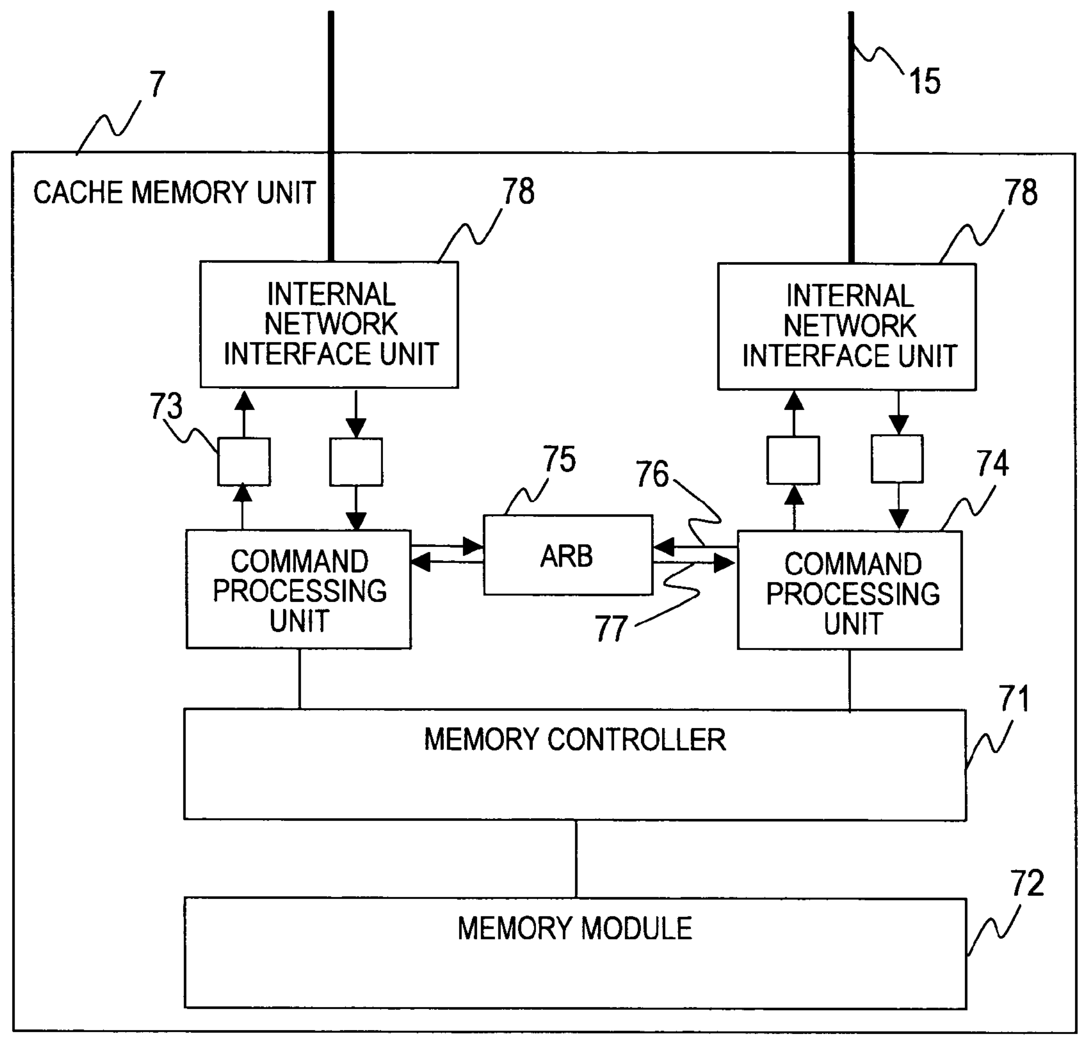
FIG. 12 is a block diagram of the configuration of the cache memory unit in the module according to the embodiment of this invention.

FIG. 12 is a block diagram of the configuration of the cache memory unit 7 in the module 10 according to the embodiment of this invention.

The cache memory unit 7 has a memory controller 71, a memory module 72, a buffer 73, a command processing unit 74, an arbiter (ARB) 75, and an internal network interface unit 78. The cache memory unit 7 prepares for each internal path 15 connected to the cache memory unit 7 a specific set of the internal network interface 78, the buffers 73, and the command processing unit 74.

The memory module 72 temporarily stores data requested by the host computer 2 to be read and data requested by the host computer 2 to be written. The memory controller 71 controls the memory module 72 to write/read data in the memory module 72.

The internal network interface unit 78 is an interface connected to the internal switch unit 9 via the internal path 15. The internal network interface unit 78 receives a packet from the outside, and converts the received packet into a format that can be processed inside the cache memory unit 7. The internal network interface unit 78 stores the converted packet in the buffer 73.

The buffer 73 temporarily stores the packet received from the internal network interface unit 78.

The command processing unit 74 sequentially extracts packets stored in the buffer 73 and processes the extracted packet. Specifically, the command processing unit 74 judges whether the extracted packet is the read request packet 300 or the write request packet 320.

When the extracted packet is the read request packet 300, the command processing unit 74 reads out of the memory module 72 data requested by this read request packet 300 to be read. The command processing unit 74 then creates the read completion packet 310 that contains the read data. The command processing unit 74 sends the created read completion packet 310 to the requester which has sent the read request packet 300.

When the extracted packet is the write request packet 320, the command processing unit 74 writes in the memory module 72 data requested by this write request packet 320 to be written. The command processing unit 74 then creates the write completion packet 330. The command processing unit 74 sends the created write completion packet 330 to the requester which has sent the write request packet 320.

The memory controller 71 and the memory module 72 are shared by the plurality of command processing units 74. The arbiter 75 mediates competition between the command processing units 74 for access to the memory controller 71. Specifically, the arbiter 75 uses a round robin algorithm or the like to determine which command processing unit 74 is to be granted access to the memory controller 71.

To access the memory controller 71, the command processing units 74 therefore send access requests to the arbiter 75 via a REQ signal line 76. Receiving the access request, the arbiter 75 determines which command processing unit 74 is to be granted access to the memory controller 71. The arbiter 75 then sends an access permission via a GNT signal line 77 to the determined command processing unit 74.

The shared memory unit 8 has the same configuration as that of the cache memory unit 7. However, data stored in the shared memory unit 8 and data stored in the cache memory unit 7 have different uses, which give them different average data lengths. The capacities of the memory module 72 and the buffer 73 in the shared memory unit 8 are therefore different from those in the cache memory unit 7.

Figure 13:
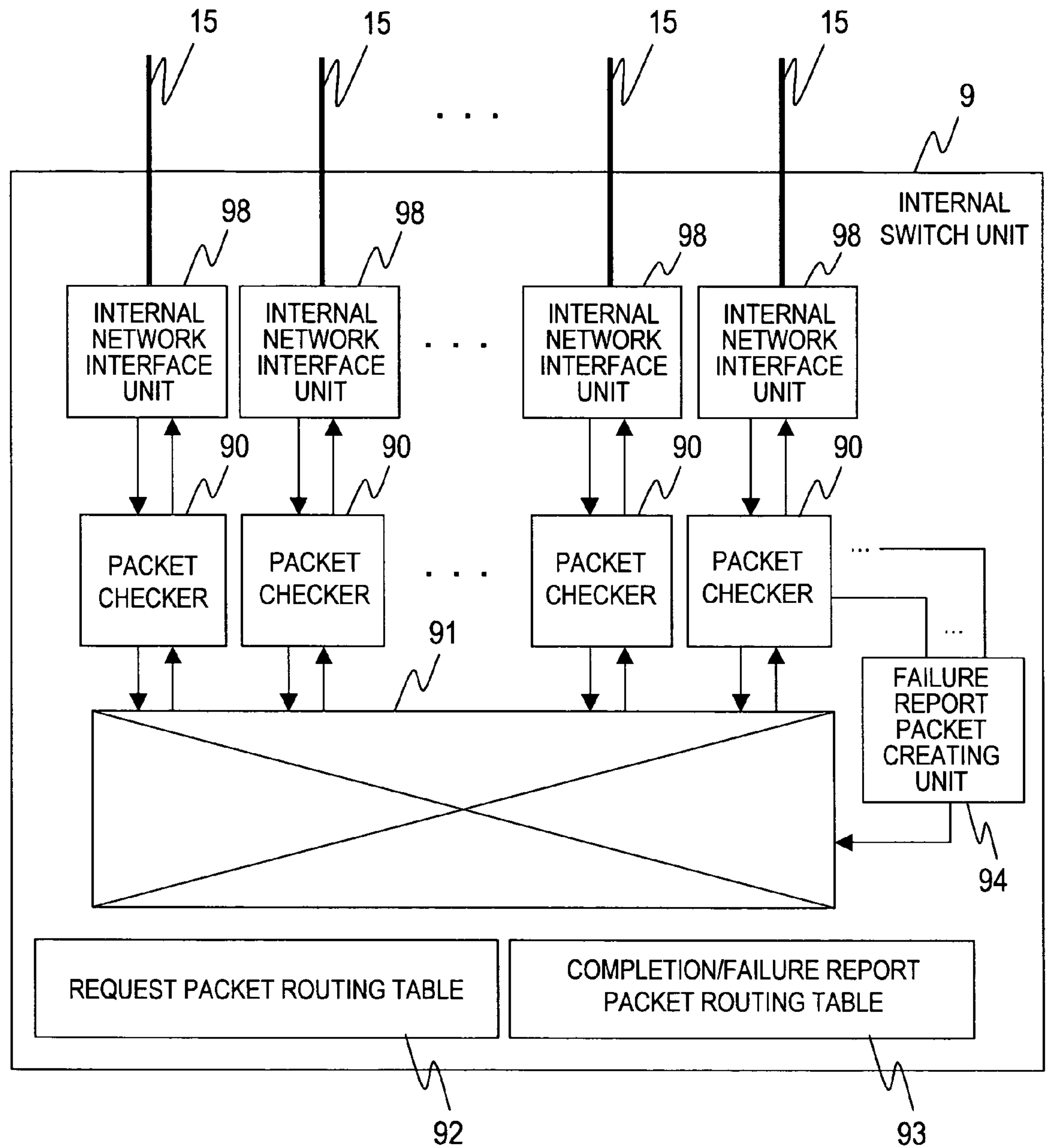
FIG. 13 is a block diagram of the configuration of the internal switch unit in the module according to the embodiment of this invention.

FIG. 13 is a block diagram of the configuration of the internal switch unit 9 in the module 10 according to the embodiment of this invention.

The internal switch unit 9 has the packet checker 90, a switching unit 91, a request packet routing table 92, a completion/failure report packet routing table 93, a failure report packet creating unit 94, and an internal network interface unit 98. The internal switch unit 9 prepares for each internal path 15 connected to the internal switch unit 9 a specific set of the packet checker 90 and the internal network interface unit 98.

The request packet routing table 92 shows the association between the destination address 302 or 322 contained in the request packet 300 or 320 and the internal path 15 over which this request packet 300 or 320 is sent.

The completion/failure report packet routing table 93 shows the association between the requester ID 312 or 332 contained in the completion packet 310 or 330, or the requester ID 342 contained in the failure report packet 340, and the internal path 15 over which this completion packet 310 or 330, or failure report packet 340, is sent.

The request packet routing table 92 and the completion/failure report packet routing table 93 are set when the initial settings are set or when the system is expanded.

The internal network interface unit 98 is an interface connected via the internal path 15 to any one of components including the channel control unit 4, the disk control unit 5, the cache memory unit 7, the shared memory unit 8, and another internal switch 9. The internal network interface unit 98 receives a packet from the outside and converts the received packet into a format that can be processed inside the internal switch unit 9. The internal network interface unit 98 sends the converted packet to the packet checker 90.

The packet checker 90 receives the packet from the internal network interface unit 98 and identifies the type of the received packet. When the received packet is the completion packet 310 or 330 or the failure report packet 340, the packet checker 90 resets a timeout time set to the received packet 310, 330, or 340. The packet checker 90 then sends the packet received from the internal network interface unit 98 to the switching unit 91. Details of the packet checker 90 will be described with reference to FIG. 14.

The switching unit 91 examines the packet received from the packet checker 90 in order to choose which internal path 15 to use in transmission of this packet.

Specifically, the switching unit 91 identifies the type of the received packet. When the received packet is the completion packet 310 or 330 or the failure report packet 340, the switching unit 91 extracts the requester ID 312, 332, or 342 from the received packet 310, 330, or 340. The switching unit 91 chooses which internal path 15 to use for transmission of the received packet 310, 330, or 340 based on the extracted requester ID 312, 332, or 342 and the completion/failure report routing table 93.

When the received packet is the request packet 300 or 320, on the other hand, the switching unit 91 extracts the destination address 302 or 322 from the received request packet 300 or 320. The switching unit 91 chooses which internal path 15 to use for transmission of the received request packet 300 or 320 based on the extracted destination address 302 or 322 and the request packet routing table 92.

Next, the switching unit 91 sends the received packet to the packet checker 90 that is connected to the chosen internal path 15.

The packet checker 90 receives the packet from the switching unit 91 and identifies the type of the received packet. When the received packet is the request packet 300 or 320, the packet checker 90 extracts the requester ID 303 or 323 and the tag number 304 or 324 from the received request packet 300 or 320. The packet checker 90 stores the extracted requester ID 303 or 323 and tag number 304 or 324. The packet checker 90 thus sets a timeout time in the completion packet 310 or 330 that is associated with the received request packet 300 or 320. Thereafter, the packet checker 90 sends the packet received from the switching unit 91 to the internal network interface unit 98.

The internal network interface unit 98 converts the packet received from the packet checker 90 into a format that makes the packet transmissible over the internal path 15. The internal network interface unit 98 sends the converted packet over the internal path 15.

When detecting the elapse of the timeout time set to the completion packet 310 or 330, the packet checker 90 requests the failure report packet creating unit 94 to create the failure report packet 340 that reports timeout. The packet checker 90 makes this request by notifying the failure report packet creating unit 94 of the requester ID 303 or 323 and tag number 304 or 324 of the request packet 300 or 320 that has expired the timeout time.

The failure report packet creating unit 94 creates the failure report packet 340 in response to the request. The failure report packet creating unit 94 sends the created failure report packet 340 to the switching unit 91. Containing the requester ID 303 or 323 and the tag number 304 or 324 that have been notified by the packet checker 90, the failure report packet 340 is sent to a component that is identified by the requester ID 303 or 323 notified by the packet checker 90.

When link down of the internal path 15 occurs, the packet checker 90 that is connected to this internal path 15 cannot send the request packet 300 or 320 over the internal path 15 experiencing link down. Then the packet checker 90 requests the failure report packet creating unit 94 to create the failure report packet 34 that reports link down. The packet checker 90 makes this request by notifying the failure report packet creating unit 94 of the requester ID 303 or 323 and tag number 304 or 324 of the request packet 300 or 320 that cannot been transmitted due to the link down.

Figure 14:
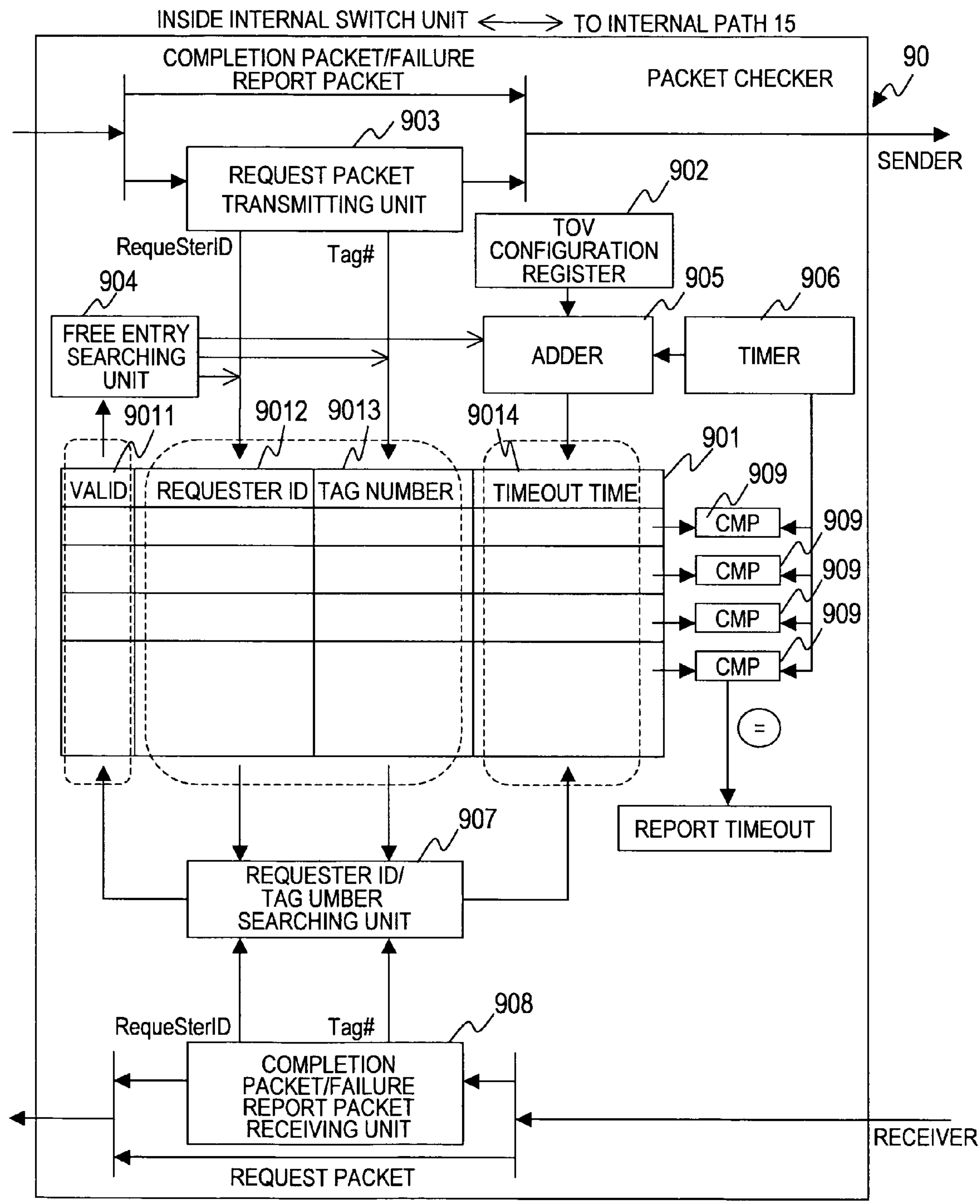
FIG. 14 is a block diagram of the configuration of the packet checker according to the embodiment of this invention.

FIG. 14 is a block diagram of the configuration of the packet checker 90 according to the embodiment of this invention.

The packet checker 90 is included in the channel control unit 4, the disk control unit 5, or the internal switch unit 9 (component). The component has as many packet checkers 90 as the number of internal paths 15 connected to this component. The packet checker 90 judges whether or not the completion packet 310 or 330 associated with the request packet 300 or 320 returns within a set time.

The packet checker 90 has a tag number table 901, a timeout value configuration register (TOV configuration register) 902, a request packet transmitting unit 903, a free entry searching unit 904, an adder 905, a timer 906, a requester ID/tag number searching unit 907, a completion packet/failure packet receiving unit 908, and a comparator (CMP) 909.

The tag number table 901 contains a validity field 9011, a field for a requester ID 9012, a field for a tag number 9013, and a field for a timeout time 9014.

The validity field 9011 indicates whether information held in this entry is valid or not. For instance, when this entry is valid, "valid" is stored in the validity field 9011 whereas "invalid" is stored in the validity field 9011 when this entry is invalid.

The requester ID 9012 indicates an identifier unique to a component that has issued the request packet 300 or 320 associated with the completion packet 310 or 330 to which the timeout time 9014 of this entry is set. Accordingly, the requester ID 9012 also indicates the requester ID 312 or 332 of the completion packet 310 or 330 to which the timeout time 9014 of this entry is set.

The tag number 9013 indicates an identifier for identifying the request packet 300 or 320 that is associated with the completion packet 310 or 330 to which the timeout time 9014 of this entry is set. Accordingly, the tag number 9013 also indicates the tag number 313 or 333 of the completion packet 310 or 330 to which the timeout time 9014 of this entry is set.

The timeout time 9014 indicates a time at which it is judged that the completion packet 310 or 330 identified by the requester ID 9012 and tag number 9013 of this entry has run out of time, causing timeout error.

The TOV configuration register 902 stores timeout values. A timeout value is a time period counted from the transmission of the request packet 300 or 320 until it is judged that the completion packet 310 or 330 associated with this request packet 300 or 320 has run out of time, causing timeout error. The timer 906 shows the current time.

Processing executed when the packet checker 90 sends the request packet 300 or 320 over the internal path 15 will be described first.

The request packet transmitting unit 903 receives the request packet 300 or 320. The request packet transmitting unit 903 extracts the request ID 303 or 323 and the tag number 304 or 324 from the received request packet 300 or 320.

The free entry searching unit 904 searches the tag number table 901 for an entry that does not hold a valid value (free entry). Specifically, the free entry searching unit 904 searches the tag number table 901 for an entry that has "invalid" in the validity field 9011.

The request packet transmitting unit 903 stores "valid" in the validity field 9011 of the entry found by the free entry searching unit 904. The request packet transmitting unit 903 then stores the extracted requester ID 303 or 323 as the requester ID 9012 of the entry found by the free entry searching unit 904. As the tag number 9013 of the entry found by the free entry searching unit 904, the request packet transmitting unit 903 stores the extracted tag number 304 or 324.

The adder 905 obtains a timeout value from the TOV configuration register 902. The adder 905 then obtains the current time from the timer 906. The adder 905 adds the obtained timeout value to the obtained current time, and stores the sum as the timeout time 9014 of the entry found by the free entry searching unit 904.

Meanwhile, the comparator 909 chooses an entry that has "valid" in the validity field 9011, and performs the following processing. The comparator 909 extracts the timeout time 9014 from the chosen entry. The comparator 909 then obtains the current time from the timer 906. The comparator 909 judges whether or not the obtained current time has reached the extracted timeout time 9014.

In the case where the current time is over the timeout time 9014, the comparator 909 judges that the completion packet 310 or 330 associated with the chosen entry has run out of time causing timeout error. Then the comparator 909 extracts the requester ID 9012 and the tag number 9013 from the chosen entry. The comparator 909 notifies failure report packet creating unit 94 of the extracted requester ID 9012 and the extracted tag number 9013, thus requesting the failure report packet creating unit 94 to create the failure report packet 340 that reports timeout. The timeout detection processing by the comparator 909 is executed independently of packet transmission/reception processing by the packet checker 90.

Described next is processing that is executed when the packet checker 90 receives the completion packet 310 or 330 or the failure report packet 340 over the internal path 15.

The completion packet/failure report packet receiving unit 908 receives the completion packet 310 or 330 or the failure report packet 340. The completion packet/failure report packet receiving unit 908 extracts the requester ID 312, 332 or 342 and the tag number 313, 333 or 343 from the received completion packet 310 or 330 or failure report packet 340.

The completion packet/failure report packet receiving unit 908 next selects entries of the tag number table 901 that have "valid" in the validity field 9011. From the selected entries of the tag number table 901, the completion packet/failure report packet receiving unit 908 selects entries whose requester ID 9012 matches the extracted requester ID 312, 332, or 342. The completion packet/failure report packet receiving unit 908 then chooses from these selected entries an entry of the tag number table 901 whose tag number 9013 matches the extracted tag number 313, 333, or 343.

The completion packet/failure report packet receiving unit 908 stores "invalid" in the validity field 9011 of the chosen entry. At this point, the completion packet/failure report packet receiving unit 908 may delete information stored as the requester ID 9012, tag number 9013, and timeout time 9014 of the chosen entry. The completion packet/failure report packet receiving unit 908 thus resets a timeout time set to the received completion packet 310 or 330. A processor or the like may serve as the packet checker 90.

Figure 15:
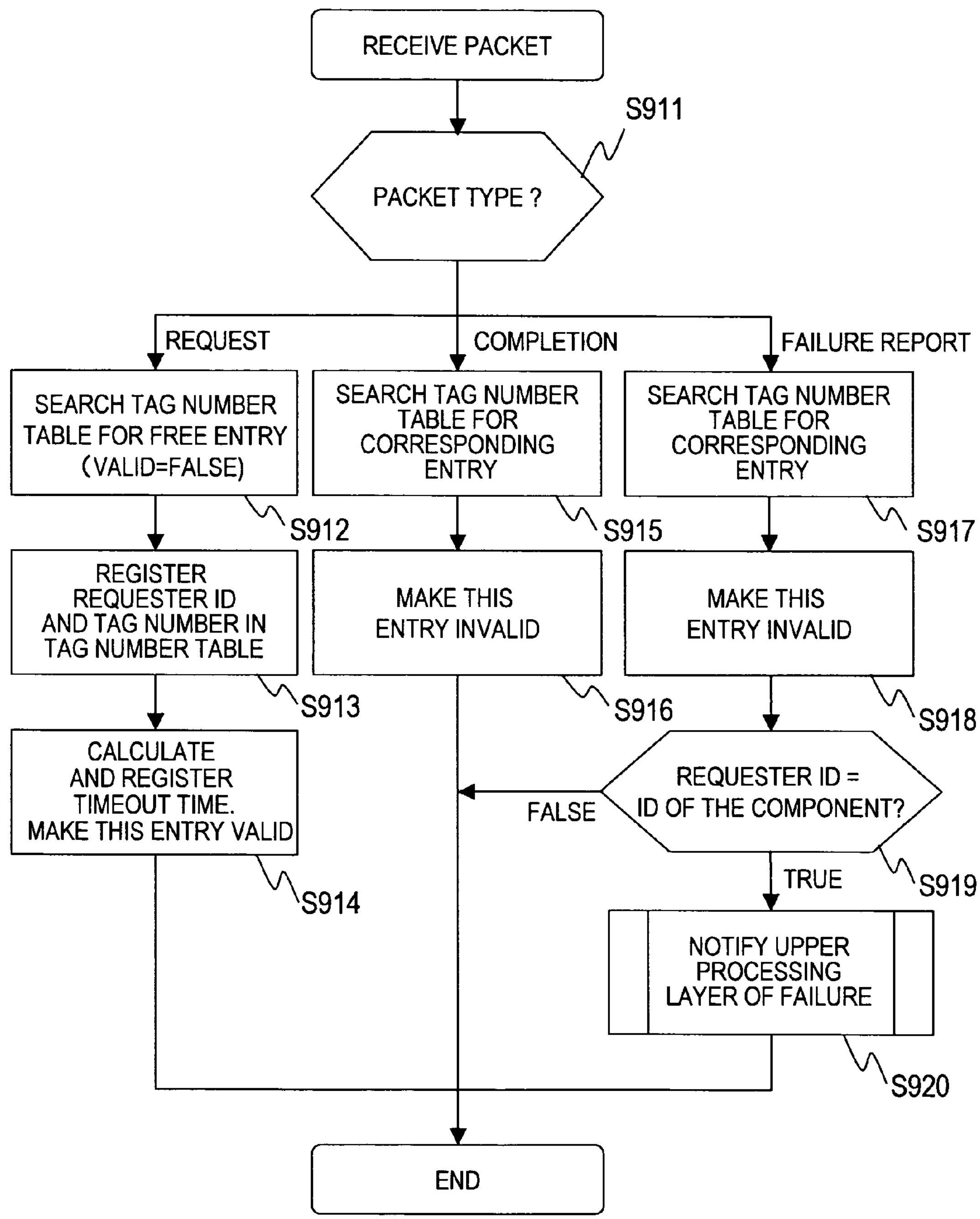
FIG. 15 is a flow chart for tag number table update processing which is executed by the packet checker according to the embodiment of this invention.

FIG. 15 is a flow chart for tag number table update processing which is executed by the packet checker 90 according to the embodiment of this invention.

The packet checker 90 starts the tag number table update processing upon reception of a packet. First, the packet checker 90 determines the type of the received packet (S911).

When the received packet is the request packet 300 or 320, the packet checker 90 searches the tag number table 901 for a free entry (S912). Specifically, the packet checker 90 searches the tag number table 901 for one of entries that have "invalid" in the validity field 9011.

The packet checker 90 next extracts the requester ID 303 or 323 and the tag number 304 or 324 from the received request packet 300 or 320. The packet checker 90 stores the extracted requester ID 303 or 323 as the requester ID 9012 of the found entry. As the tag number 9013 of the found entry, the packet checker 90 stores the extracted tag number 304 or 324 (S913).

Next, the packet checker 90 adds a timeout value stored in the TOV configuration register 902 to the current time obtained from the timer 906. The packet checker 90 stores the sum as the timeout time 9014 of the found entry. The packet checker 90 further stores "valid" in the validity field 9011 of the found entry, thereby validating the found entry (S914). The packet checker 90 then ends the tag number table update processing.

When the received packet is the completion packet 310 or 330, on the other hand, the packet checker 90 searches the tag number table 901 for an entry that is associated with the received completion packet 310 or 330 (S915).

Specifically, the packet checker 90 extracts the requester ID 312 or 332 and the tag number 313 or 333 from the received completion packet 310 or 330. The packet checker 90 next selects entries of the tag number table 901 that have "valid" in the validity field 9011.

From the selected entries of the tag number table 901, the packet checker 90 selects entries whose requester ID 9012 matches the extracted requester ID 312 or 332. The packet checker 90 then chooses from these selected entries an entry of the tag number table 901 whose tag number 9013 matches the extracted tag number 313 or 333.

Next, the packet checker 90 stores "invalid" in the validity field 9011 of the chosen entry, thereby invalidating the entry that is associated with the received completion packet 310 or 330 (S916). The packet checker 90 then ends the tag number table update processing.

When the received packet is the failure report packet 340, on the other hand, the packet checker 90 searches the tag number table 901 for an entry that is associated with the received failure report packet 340 (S917).

Specifically, the packet checker 90 extracts the requester ID 342 and the tag number 343 from the received failure report packet 340. The packet checker 90 next selects entries of the tag number table 901 that have "valid" in the validity field 9011.

From the selected entries of the tag number table 901, the packet checker 90 selects entries whose requester ID 9012 matches the extracted requester ID 342. The packet checker 90 then chooses from these selected entries an entry of the tag number table 901 whose tag number 9013 matches the extracted tag number 343.

Next, the packet checker 90 stores "invalid" in the validity field 9011 of the chosen entry, thereby invalidating the entry that is associated with the received failure report packet 340 (S918).

The packet checker 90 next judges whether or not the extracted requester ID matches the identifier of a component that has this packet checker 90 (S919). When the extracted requester ID does not match the identifier of the component having this packet checker 90, the request packet 300 or 320 that is associated with this failure report packet 340 is created by other components than the one having this packet checker 90. The packet checker 90 therefore terminates the tag number table update processing immediately.

When the extracted requester ID matches the identifier of the component having this packet checker 90, the request packet 300 or 320 that is associated with this failure report packet 340 is created by the component having this packet checker 90. The packet checker 90 therefore notifies an upper processing layer of the detection of a failure (S920). For instance, the packet checker 90 notifies, via the failure report signal line 119, the processor 111 or the like of failure detection. The packet checker 90 sends the contents of this failure report packet 340 to the processor 111 or the like along with the failure detection message. The packet checker 90 then ends the tag number table update processing.

Notified of failure detection, the processor 111 executes failure handling. Details of the failure handling executed by the processor 111 will be described with reference to FIG. 17.

Figure 16:
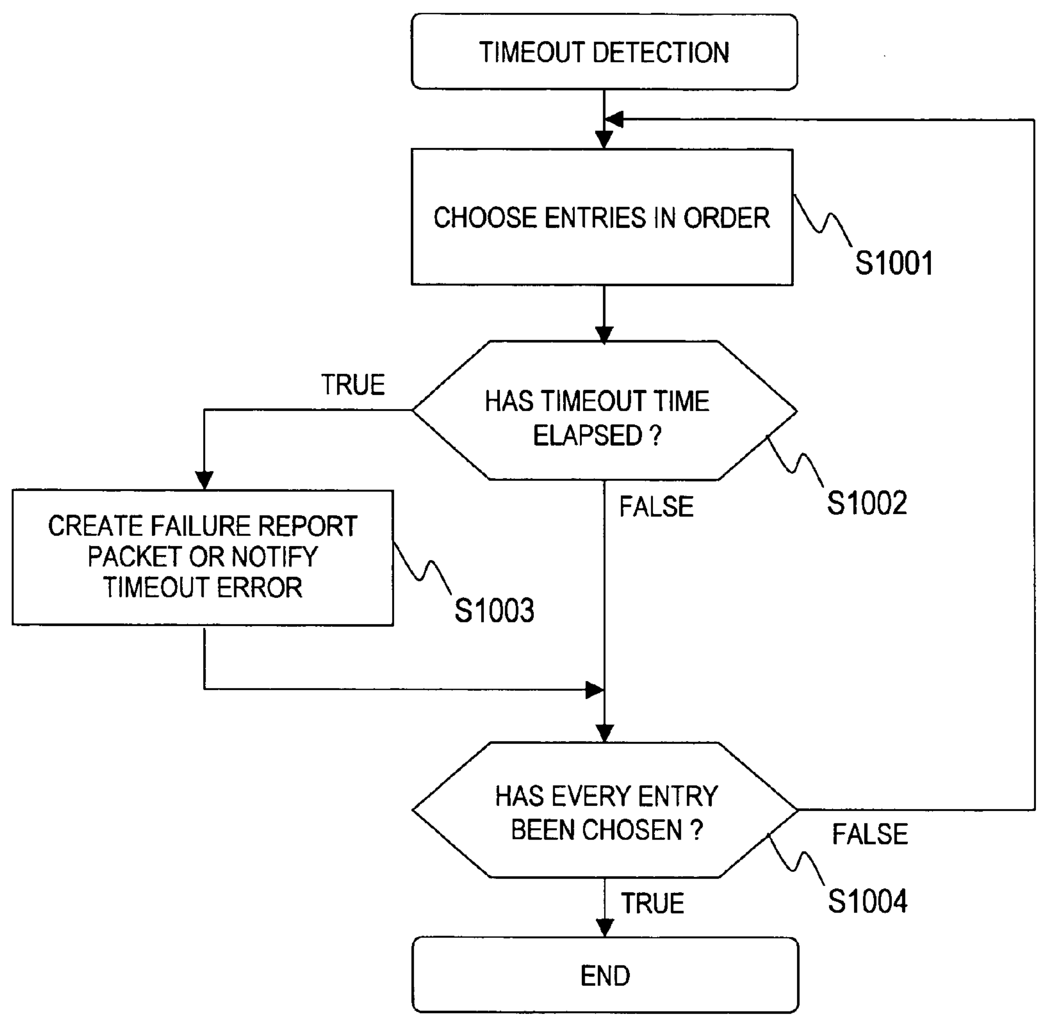
FIG. 16 is a flow chart for timeout detection processing which is executed by the packet checker according to the embodiment of this invention.

FIG. 16 is a flow chart for timeout detection processing which is executed by the packet checker 90 according to the embodiment of this invention.

The packet checker 90 executes the tag number table update processing and the timeout detection processing out of sync with each other. The packet checker 90 performs the timeout detection processing at regular intervals, for example.

First, the packet checker 90 selects entries in the tag number table 901 in a descending order from the top (S1001).

The packet checker 90 next judges whether or not "valid" is held in the validity field 9011 of the chosen entry. When the validity field 9011 holds "invalid", the packet checker 90 moves directly to Step S1004.

When the validity field 9011 holds "valid", the packet checker 90 judges whether the timeout time 9014 of the chosen entry has elapsed or not (S1002).

In the case where the timeout time 9014 has not reached yet, the packet checker 90 proceeds directly to Step S1004. In the case where the timeout time 9014 has elapsed, the packet checker 90 judges that timeout error of the completion packet 310 or 330 that is associated with the chosen entry is detected.

Then the packet checker 90 extracts the requester ID 9012 and the tag number 9013 from the chosen entry. The packet checker 90 judges whether or not the extracted requester ID 9012 matches the identifier of a component that has this packet checker 90.

When the extracted requester ID 9012 does not match the identifier of a component that has this packet checker 90, the packet checker 90 creates and sends the failure report packet 340. The packet checker 90 then proceeds to Step S1004.

The packet type 341 of the created failure report packet 340 indicates that it is the failure report packet 340. The requester ID 342 of the created failure report packet 340 is the extracted requester ID 9012. The tag number ID 343 of the created failure report packet 340 is the extracted tag number 9013. The reporter component ID 344 of the created failure report packet 340 is the identifier of the component that has this packet checker 90. The error specifics 345 of the created failure report packet 340 indicate timeout error.

When the extracted requester ID 9012 matches the identifier of the component that has this packet checker 90, on the other hand, the packet checker 90 notifies an upper processing layer of the detection of a timeout error failure. For instance, the packet checker 90 notifies the processor 111 or the like of timeout error failure detection via the failure report signal line 119 (S1003).

Next, the packet checker 90 judges whether or not every entry in the tag number table 901 has been chosen in Step S1001 (S1004). In the case where there are still entries left to be chosen, the packet checker 90 returns to Step S1001, and repeats the processing until every entry is chosen.

In the case where every entry has been chosen, the packet checker 90 ends the timeout detection processing.

Figure 17:
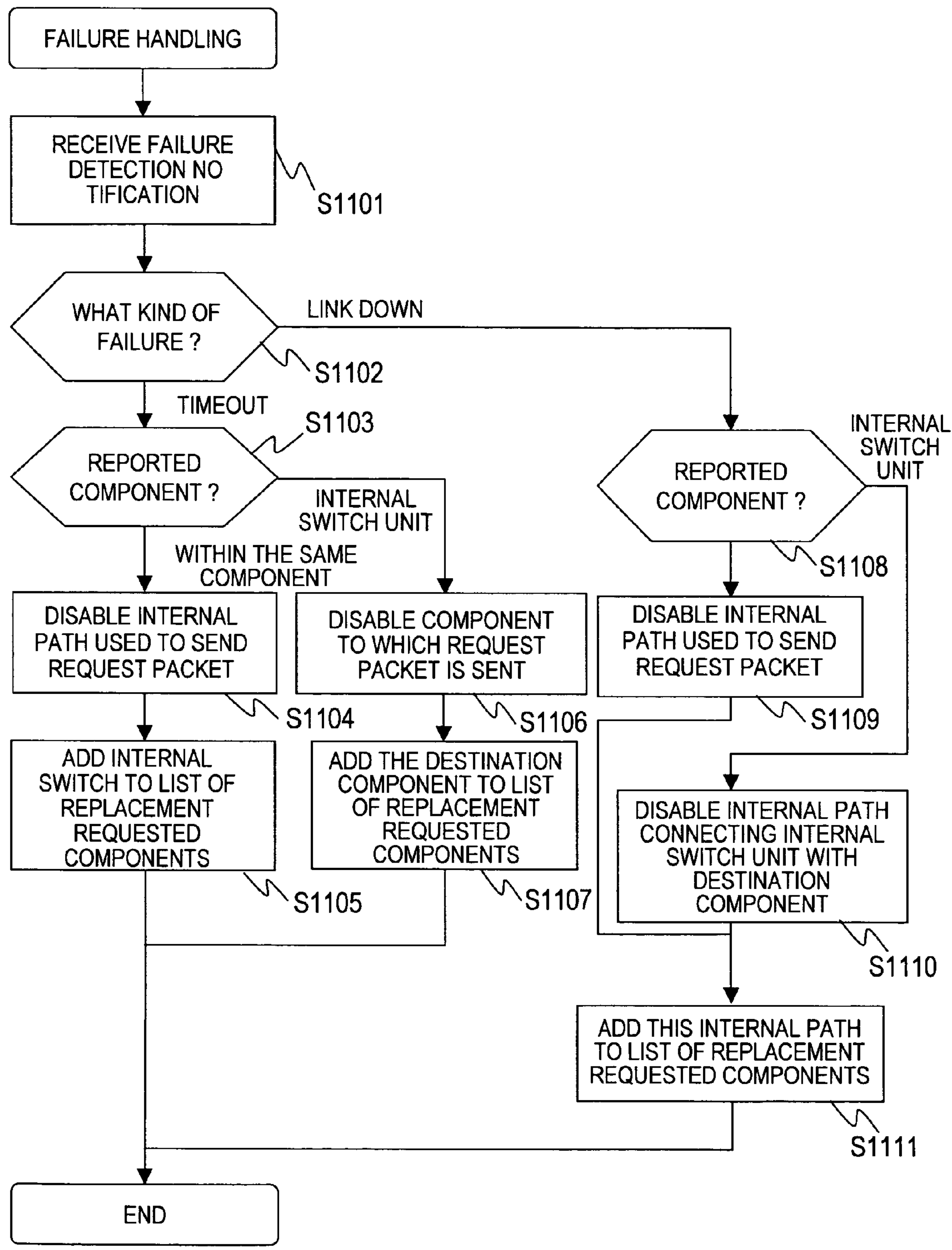
FIG. 17 is a flow chart for failure handling which is executed by the processor according to the embodiment of this invention.

FIG. 17 is a flow chart for failure handling which is executed by the processor 111 according to the embodiment of this invention.

This flow chart illustrates, for simplification, processing carried out when a failure occurs concerning access between components in the same module 10. The processor 111 may be one in the channel control unit 4 or may be one in the disk control unit 5.

The packet checker 90 sends a failure detection notification to the processor 111 when the failure report packet 340 is received or when a timeout error failure is detected. The packet checker 90 sends the specifics of the failure, the failure reporter component, and other relevant information to the processor 111 along with the failure detection notification.

The processor 111 receives the failure detection notification from the packet checker 90 (S1101). The processor 111 identifies what kind of failure has been detected. The processor 111 judges whether the detected failure is timeout error or link down error (S1102).

When the detected failure is timeout error, the processor 111 identifies the failure reporter component. The processor 111 judges whether the identified failure reporter component is the internal switch unit 9 or the packet checker 90 that is in the same component as this processor 111 (S1103).

When the failure reporter component is the packet checker 90 that is in the same component as this processor 111, the processor 111 judges that the detected failure is a failure in the internal switch unit 9. Then the processor 111 identifies the request packet 300 or 320 that is associated with the detected failure. The processor 111 disables the internal path 15 that has been used to send the identified request packet 300 or 320. Here, the processor 111 disables the internal path connected to the packet checker 90 that is the failure reporter component (S1104).

A case where the processor 111 disables the internal path 15A will be described as an example. The processor 111 in this case changes the via-path A access state 11242 of the resource management table 1124 to indicate that every component is inaccessible via the path A. This puts the internal switch unit 9 that is connected to the internal path 15A out of use.

The processor 111 next adds the internal switch unit 9 connected to the disabled internal path 15 to a list of replacement requested components (S1105).

Specifically, the processor 111 changes the resource state 11241 of the resource management table 1124 to indicate this internal switch unit 9 is experiencing a failure. The processor 111 then ends the failure handling.

When the failure reporter component is the internal switch unit 9, on the other hand, the processor 111 judges that the detected failure is a failure in a component that is the destination of the request packet 300 or 320 associated with the detected failure. A component judged as a failed component is, for example, the cache memory unit 7 or the shared memory unit 8.

Then the processor 111 identifies the request packet 300 or 320 that is associated with the detected failure. Specifically, the processor 111 identifies the associated request packet 300 or 320 from the requester ID 342 and the tag number 343 in the failure report packet 340 that the packet checker 90 has received.

The processor 111 obtains the destination address 302 or 322 contained in the identified request packet 300 or 320. The processor 111 disables a component that is identified by the obtained destination address 302 or 322 (S1106).

A case where the processor 111 disables the cache memory 7A will be described as an example. The processor 111 in this case changes the via-path A access state 11242 and the via-path B access state 11243 of the resource management table 1124 to indicate that every component is inaccessible to the cache memory 7A via the path A and the path B. This puts the cache memory 7A out of use.

Next, the processor 111 adds the component identified by the obtained destination address 302 or 322 to a list of replacement requested components (S1107).

A case where the processor adds the cache memory unit 7A to a list of replacement requested components will be described as an example. The processor 111 in this case changes the resource state 11241 of the resource management table 1124 to indicate that this cache memory unit 7A is experiencing a failure. The processor 111 then ends the failure handling.

In short, the processor 111, upon receiving a timeout error failure definition, judges that a failure has occurred in a component that is connected to the failure reporter component. In other words, the processor 111 judges that a failure has occurred in a component to which the failure reporter component was going to transfer the request packet 300 or 320 next.

Now, processing carried out when a timeout error failure occurs concerning access between different modules 10 will be described.

In the case where the internal switch unit 9 that is in the same module 10 as the processor 111 executes this processing reports a failure, the processor 111 judges that the failure is in the internal switch unit 9 to which the request packet 300 or 320 was going to be transferred next by the internal switch unit 9 that is the failure reporter component. In other words, the processor 111 judges that the failure is in the internal switch unit 9 that is in the module 10 that is the transfer destination of the request packet 300 or 320.

In the case where the internal switch unit 9 in any other module 10 than the one that has this processor 110 reports a failure, the processor 111 judges that the reported failure is in a component that is the destination of the request packet 300 or 320 associated with the failure.

When the detected failure is link down error, on the other hand, the processor 111 identifies the failure reporter component. The processor 111 judges whether the identified failure reporter component is the internal switch unit 9 or the packet checker 90 that is in the same component as this processor 111.

When the failure reporter component is the packet checker 90 that is in the same component as this processor 111, the processor 111 identifies the request packet 300 or 320 that is associated with the detected failure. Out of the internal paths 15 connected to the component that has this processor 111, the processor 111 judges that the detected failure is in the internal path 15 over which the identified request packet 300 or 320 has been sent. The processor 111 disables the internal path 15 judged as the failure component. Here, the processor 111 disables the internal path 15 connected to the packet checker 90 that is the failure reporter component (S1109).

A case where the processor 111 disables the internal path 15A will be described as an example. The processor 111 in this case changes the via-path A access state 11242 of the resource management table 1124 to indicate that every component is inaccessible via the path A. This puts the internal path 15A out of use.

The processor 111 next adds the disabled internal path 15 to a list of replacement requested components (S1111).

Specifically, the processor 111 changes the resource state 11241 of the resource management table 1124 to indicate this internal path 15 is experiencing a failure. The processor 111 then ends the failure handling.

When the failure reporter component is the internal switch unit 9, on the other hand, the processor 111 identifies the request packet 300 or 320 that is associated with the detected failure. Specifically, the processor 111 identifies the associated request packet 300 or 320 from the requester ID 342 and the tag number 343 in the failure report packet 340 that the packet checker 90 has received.

The processor 111 obtains the destination address 302 or 322 contained in the identified request packet 300 or 320. The processor 111 recognizes a component that is identified by the obtained destination address 302 or 322 as the destination of the identified request packet 300 or 320.

The processor 111 judges that the detected failure is in the internal path 15 connecting this destination component and the internal switch unit 9, and disables the internal path 15 judged as the failure component (S1110).

A case where the processor 111 shuts down access via the internal path 15A to the cache memory unit 7A will be described as an example. The processor 111 in this case changes the via-path A access state 11242 of the resource management table 1124 to indicate that the cache memory unit 7A is inaccessible via the path A.

Next, the processor 111 adds the disabled internal path 15 to a list of replacement requested components (S1111). The processor 111 then ends the failure handling.

Now, processing of when a link down error failure occurs concerning access between different modules 10 will be described.

In the case where the internal switch unit 9 that is in the same module 10 as the processor 111 executing this processing reports a failure, the processor 111 judges that the failure is in the inter module path 11.

In the case where the internal switch unit 9 in any other module 10 than the one that has this processor 111 reports a failure, the processor 111 judges that the reported failure is in the internal path 15 connecting the internal switch unit 9 and the destination component.

The description given next is about failure detection and failover in the disk controller 1 according to this embodiment. Described here is a case where the channel control unit 4 accesses the write cache area 721 of the cache memory unit 7.

A case where the channel control unit 4A accesses the write cache area 721 of the cache memory unit 7A which is in the same module 10A as the channel control unit 4A will be described first.

Figure 18:
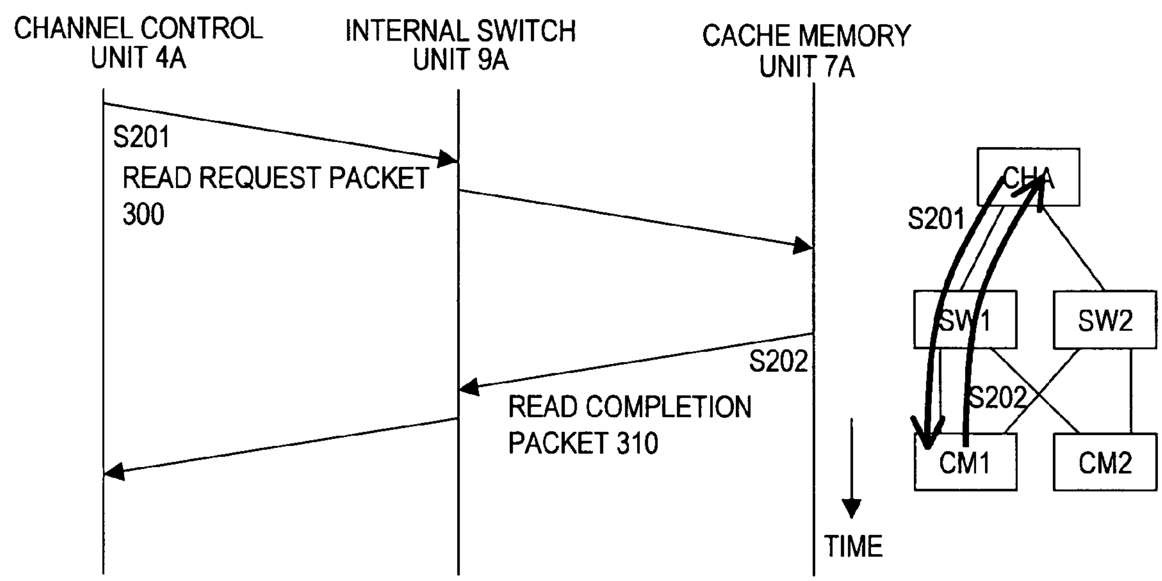
FIG. 18 is an explanatory diagram of normal processing of the disk controller according to the embodiment of this invention.

FIG. 18 is an explanatory diagram of normal processing of the disk controller 1 according to the embodiment of this invention.

This explanatory diagram shows a case where access from the channel control unit 4A to the write cache area 721 of the cache memory unit 7A is completed normally. In this explanatory diagram, the vertical direction indicates the time progress, and lines in the horizontal direction indicate components.

First, the channel control unit 4A sends the read request packet 300 to the cache memory unit 7A (S201). The read request packet 300 reaches the destination, the cache memory unit 7A, via the internal switch unit 9A.

Receiving the request packet 300, the cache memory unit 7A reads out of the memory module 72 data requested by this read request packet 300. The cache memory unit 7A sends the read completion packet 310 that contains the read data to the channel control unit 4A (S202). The cache memory unit 7A sends the read completion packet 310 over the internal path 15 through which the read request packet 300 has been received.

The same access path is used to transfer the read completion packet 310 and to transfer the read request packet 300 that is associated with this read completion packet 310. In this example, the read completion packet 310 reaches the channel control unit 4A, which is the source of the read request packet 300 associated with this read completion packet 310, via the internal switch unit 9A.

The channel control unit 4A receives the read completion packet 310, whereby this access is completed normally.

Figure 19:
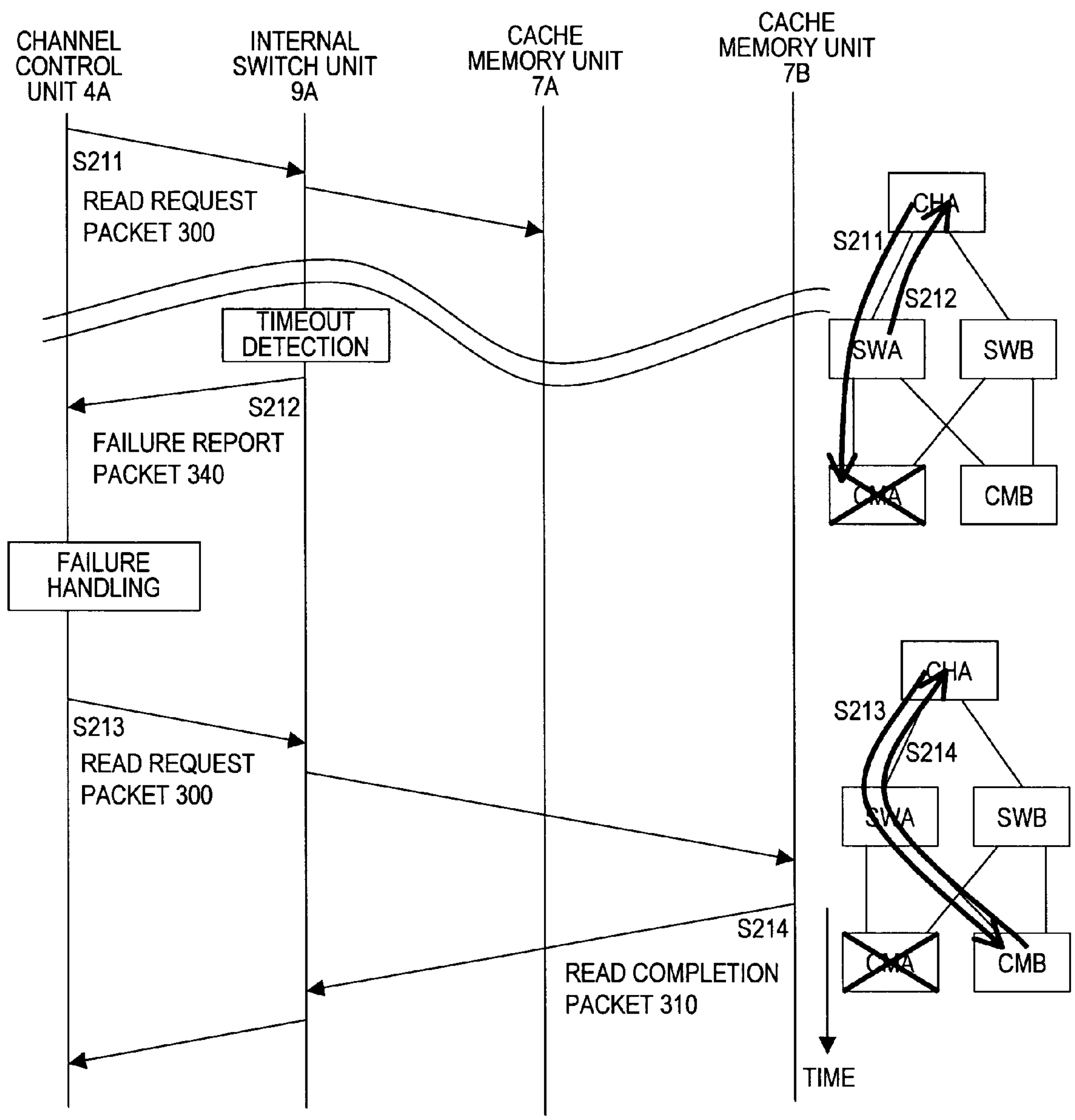
FIG. 19 is an explanatory diagram of processing that is executed in the disk controller when a failure occurs in the cache memory unit according to the embodiment of this invention.

FIG. 19 is an explanatory diagram of processing that is executed in the disk controller 1 when a failure occurs in the cache memory unit 7A according to the embodiment of this invention.

In this explanatory diagram, the vertical direction indicates the time progress, and lines in the horizontal direction indicate components.

First, the channel control unit 4A sends the read request packet 300 to the cache memory unit 7A (S211). The read request packet 300 reaches the cache memory unit 7A of the destination via the internal switch unit 9A.

However, the cache memory unit 7A is experiencing a failure and cannot send the read completion packet 310.

Then, a given time elapses before the internal switch unit 9A receives from the cache memory unit 7A the read completion packet 310 associated with the read request packet 300 that the internal switch unit 9A has transferred. The internal switch unit 9A at this point detects a timeout error failure and creates the failure report packet 340. The internal switch unit 9A sends the created failure report packet 340 to the channel control unit 4A which has sent the read request packet 300 (S212).

The channel control unit 4A receives the failure report packet 340, and extracts the requester ID 342 and the tag number 343 from the failure report packet 340. The channel control unit 4A selects entries of the tag number table 901 whose requester ID 9012 matches the extracted requester ID 342. From these selected entries, the channel control unit 4A chooses an entry of the tag number table 901 whose tag number 9013 matches the extracted tag number 343.

The channel control unit 4A stores "invalid" in the validity field 9011 of the chosen entry, thereby invalidating the chosen entry. This prevents the disk controller 1 from detecting timeout of the same read completion packet 310 more than once. This measure does not work unless timeout values set in the channel control unit 4A and timeout values set in the internal switch unit 9A are appropriate. How timeout values are set will be described later.

The channel control unit 4A further executes the failure handling shown in FIG. 17. Through the failure handling, the channel control unit 4A judges that the detected failure is in the cache memory unit 7A.

Then the channel control unit 4A sends the read request packet 300 to the cache memory unit 7B, in which a duplicate of the write cache area 721 of the cache memory unit 7A has been created for redundancy. The read request packet 300 reaches the cache memory unit 7B of the destination via the internal switch unit 9A (S213).

Receiving the request packet 300, the cache memory unit 7B reads out of the memory module 72 data requested by this read request packet 300. The cache memory unit 7B sends the read completion packet 310 that contains the read data to the channel control unit 4A (S214). At this time, the cache memory unit 7B sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9A.

The channel control unit 4A receives the read completion packet 310, whereby this access is completed.

In this way, when a failure occurs in the cache memory unit 7A, the channel control unit 4A can obtain requested data from the cache memory unit 7B, which is a duplicate of the cache memory unit 7A for redundancy.

Figure 20:
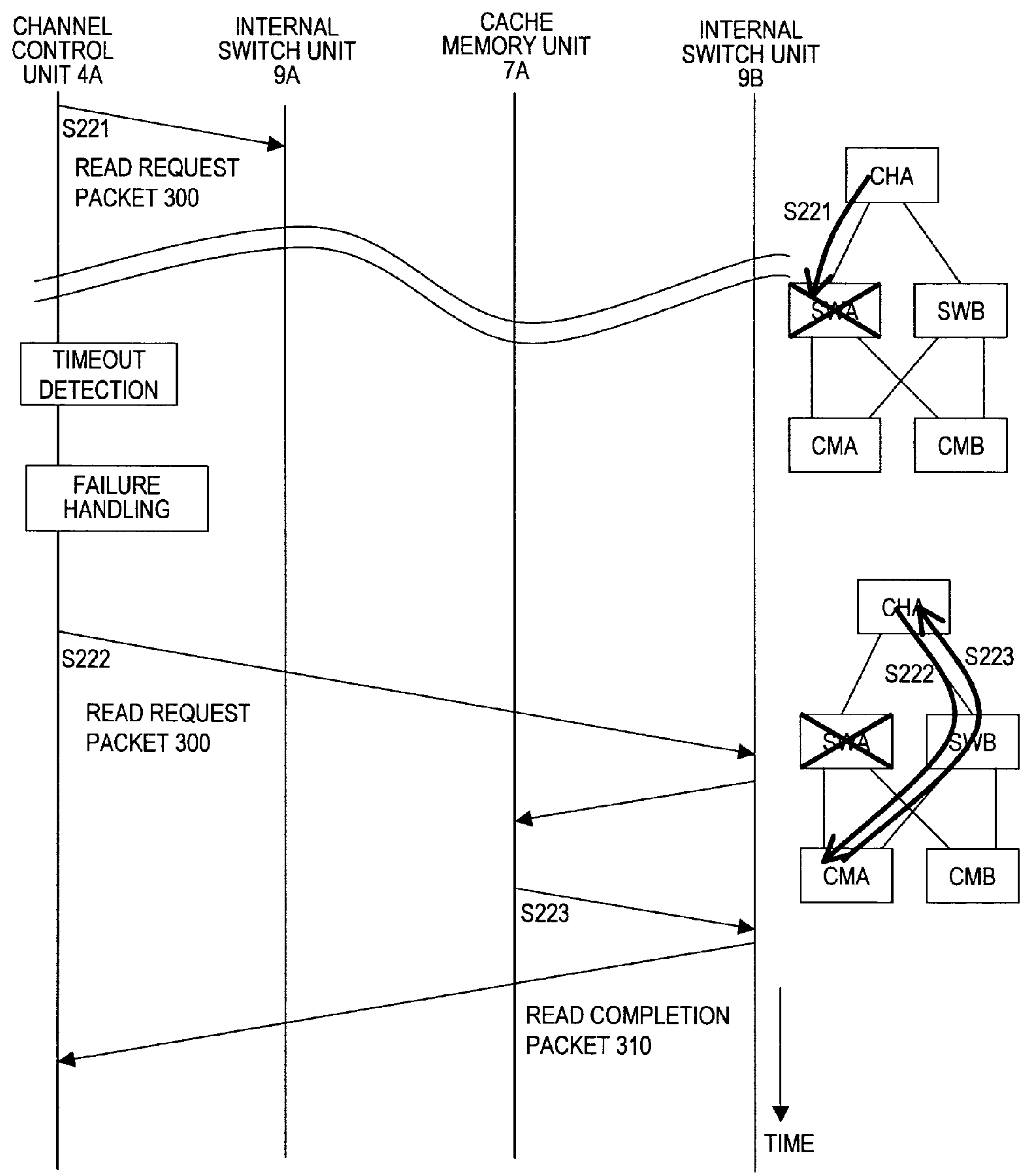
FIG. 20 is an explanatory diagram of processing that is executed in the disk controller when a failure occurs in the internal switch unit according to the embodiment of this invention.

FIG. 20 is an explanatory diagram of processing that is executed in the disk controller 1 when a failure occurs in the internal switch unit 9A according to the embodiment of this invention.

In this explanatory diagram, the vertical direction indicates the time progress, and lines in the horizontal direction indicate components.

First, the channel control unit 4A sends the read request packet 300 to the cache memory unit 7A (S221). However, a failure in the internal switch unit 9A hinders the read request packet 300 from reaching the cache memory unit 7A of the destination.

Then, a given time elapses before the channel control unit 4A receives the read completion packet 310 associated with the read request packet 300 that the channel control unit 4A has sent. The channel control unit 4A at this point detects a timeout error failure and executes the failure handling shown in FIG. 17. Through the failure handling, the channel control unit 4A judges that the detected failure is in the internal switch unit 9A. The channel control unit 4A disables the internal switch unit 9A judged as the failure component.

The channel control unit 4A next sends the read request packet 300 to the cache memory unit 7A via the internal switch unit 9B, which is a duplicate of the internal switch unit 9A for redundancy (S222). The read request packet 300 reaches the cache memory unit 7A of the destination via the internal switch unit 9B.

Receiving the request packet 300, the cache memory unit 7A reads out of the memory module 72 data requested by this read request packet 300. The cache memory unit 7A sends the read completion packet 310 that contains the read data to the channel control unit 4A (S223). The cache memory unit 7A sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9B.

The channel control unit 4A receives the read completion packet 310, whereby this access is completed.

In this way, when a failure occurs in the internal switch unit 9A, the channel control unit 4A can access the cache memory unit 7A via other internal switch units 9 than the failed internal switch unit 9A, in this example, the internal switch unit 9B.

Described next is a case where the channel control unit 4A accesses the write cache area 721 of the cache memory unit 7 that is in any other module 10 than the one having the channel control unit 4A. Specifically, a case where the channel control unit 4A in the module 10A accesses the write cache area 721 of the cache memory unit 7C in the module 10B will be described.

Figure 21:
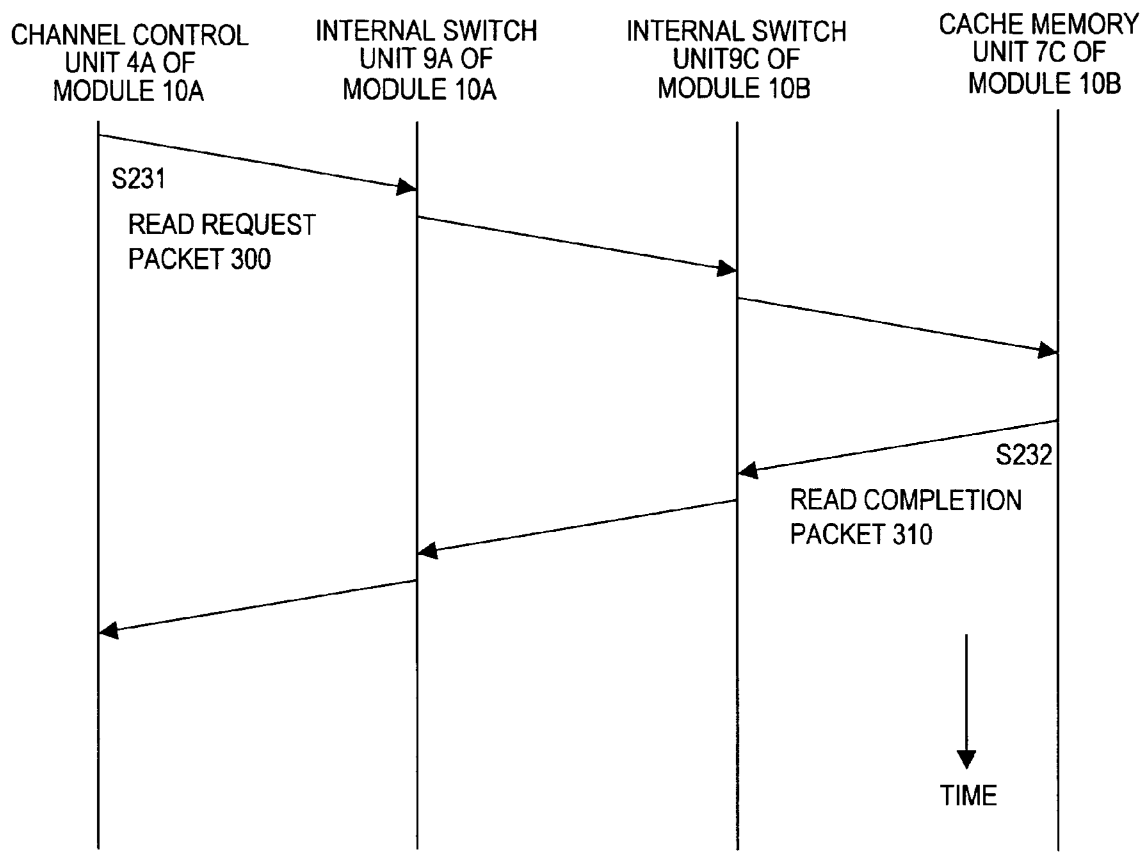
FIG. 21 is an explanatory diagram of normal processing of the disk controller according to the embodiment of this invention.
Figure 21:
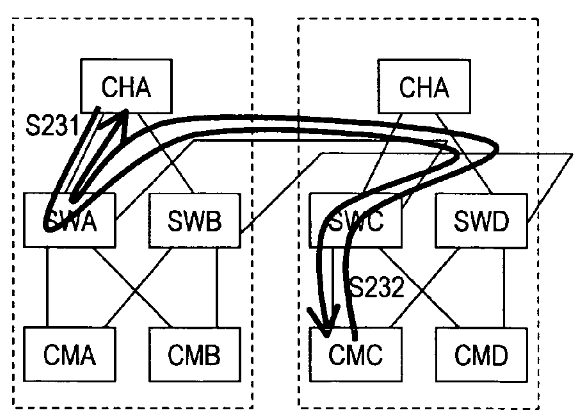

FIG. 21 is an explanatory diagram of normal processing of the disk controller 1 according to the embodiment of this invention.

This explanatory diagram shows a case where access from the channel control unit 4A in the module 10A to the write cache area 721 of the cache memory unit 7C in the module 10B is completed normally. In this explanatory diagram, the vertical direction indicates the time progress, and lines in the horizontal direction indicate components.

First, the channel control unit 4A in the module 10A sends the read request packet 300 to the cache memory unit 7C in the module 10B (S231). The read request packet 300 reaches the cache memory unit 7C of the destination via the internal switch unit 9A in the module 10A and the internal switch unit 9C in the module 10B.

Receiving the read request packet 300, the cache memory unit 7C in the module 10B reads out of the memory module 72 data requested by this read request packet 300. The cache memory unit 7C in the module 10B sends the read completion packet 310 that contains the read data to the channel control unit 4A in the module 10A (S232). The cache memory unit 7C in the module 10B sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9C in the module 10B and the internal switch unit 9A in the module 10A.

The channel control unit 4A in the module 10A receives the read completion packet 310, whereby this access is completed normally.

Figure 22:
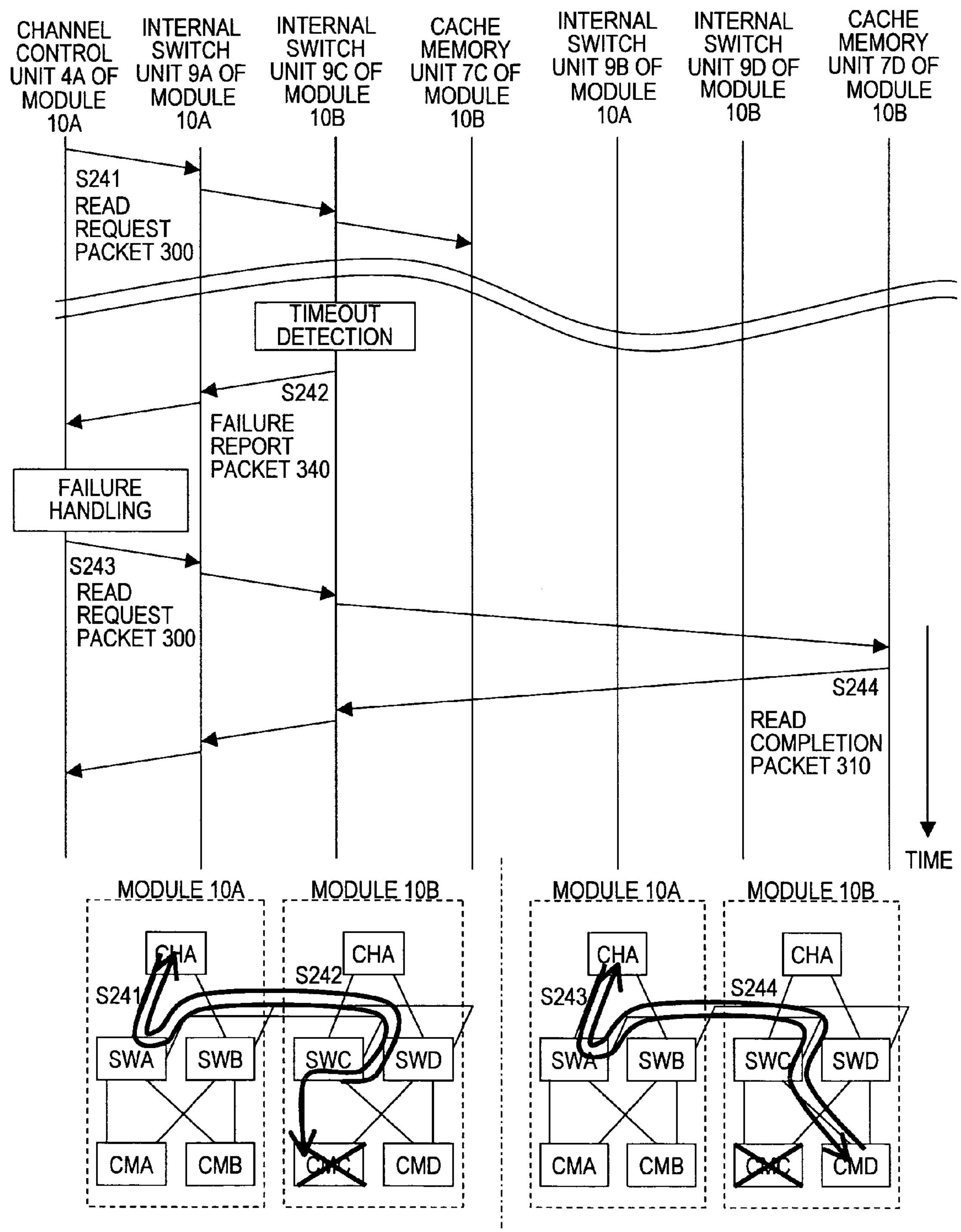
FIG. 22 is an explanatory diagram of processing that is executed in the disk controller when a failure occurs in the cache memory unit in the module according to the embodiment of this invention.

FIG. 22 is an explanatory diagram of processing that is executed in the disk controller 1 when a failure occurs in the cache memory unit 7C in the module 10B according to the embodiment of this invention.

In this explanatory diagram, the vertical direction indicates the time progress, and lines in the horizontal direction indicate components.

First, the channel control unit 4A in the module 10A sends the read request packet 300 to the cache memory unit 7C in the module 10B (S241). The read request packet 300 reaches the cache memory unit 7C of the destination via the internal switch unit 9A in the module 10A and the internal switch unit 9C in the module 10B.

However, the cache memory unit 7C in the module 10B is experiencing a failure and cannot send the read completion packet 310.

Then, a given time elapses before the internal switch unit 9C in the module 10B receives from the cache memory unit 7C in the module 10B the read completion packet 310 associated with the read request packet 300 that the internal switch unit 9C has transferred. The internal switch unit 9C in the module 10B at this point detects a timeout error failure and creates the failure report packet 340. The internal switch unit 9C in the module 10B sends the created failure report packet 340 to the channel control unit 4A, which has sent the read request packet 300, via the internal switch unit 9A in the module 10A (S242).

The internal switch unit 9A in the module 10A transfers the failure report packet 340 to the channel control unit 4A in the module 10A. Before transferring the failure report packet 340, the internal switch unit 9A in the module 10A extracts the requester ID 342 and the tag number 343 from the failure report packet 340 to be transferred. The internal switch unit 9A in the module 10A selects entries of the tag number table 901 whose requester ID 9012 matches the extracted requester ID 342. From these selected entries, the internal switch unit 9A in the module 10A chooses an entry of the tag number table 901 whose tag number 9013 matches the extracted tag number 343.

The internal switch unit 9A in the module 10A stores "invalid" in the validity field 9011 of the chosen entry, thereby invalidating the chosen entry. This prevents a situation in which timeout of the same read completion packet 310 is detected by both of the internal switch unit 9A in the module 10A and the internal switch unit 9C in the module 10B. This measure does not work unless timeout values set in the internal switch unit 9A in the module 10A and timeout values set in the internal switch unit 9C in the module 10B are appropriate.

The channel control unit 4A in the module 10A receives the failure report packet 340, and extracts the requester ID 342 and the tag number 343 from the failure report packet 340. The channel control unit 4A in the module 10A selects entries of the tag number table 901 whose requester ID 9012 matches the extracted requester ID 342. From these selected entries, the channel control unit 4A in the module 10A chooses an entry of the tag number table 901 whose tag number 9013 matches the extracted tag number 343.

The channel control unit 4A in the module 10A stores "invalid" in the validity field 9011 of the chosen entry, thereby invalidating the chosen entry. This prevents a situation in which timeout of the same read completion packet 310 is detected by both of the channel control unit 4A in the module 10A and the internal switch unit 9C in the module 10B. This measure does not work unless timeout values set in the channel control unit 4A in the module 10A and timeout values set in the internal switch unit 9C in the module 10B are appropriate. How timeout values are set will be described later.

The channel control unit 4A in the module 10A further executes the failure handling shown in FIG. 17. Through the failure handling, the channel control unit 4A in the module 10A judges that the detected failure is in the cache memory unit 7C in the module 10B.

Then the channel control unit 4A in the module 10A sends the read request packet 300 to the cache memory unit 7D, in which a duplicate of the write cache area 721 of the cache memory unit 7C in the module 10B has been created for redundancy. The read request packet 300 reaches the cache memory unit 7D of the destination via the internal switch unit 9A in the module 10A and the internal switch unit 9C in the module 10B (S243).

Receiving the read request packet 300, the cache memory unit 7D in the module 10B reads out of the memory module 72 data requested by this read request packet 300. The cache memory unit 7D in the module 10B sends the read completion packet 310 that contains the read data to the channel control unit 4A in the module 10A (S244). The cache memory unit 7D in the module 10B sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9C in the module 10B and the internal switch unit 9A in the module 10A.

The channel control unit 4A in the module 10A receives the read completion packet 310, whereby this access is completed.

In this way, when a failure occurs in the cache memory unit 7C in the module 10B, the channel control unit 4A in the module 10A can obtain requested data from the cache memory unit 7D, which is a duplicate of the cache memory unit 7C for redundancy.

Figure 23:
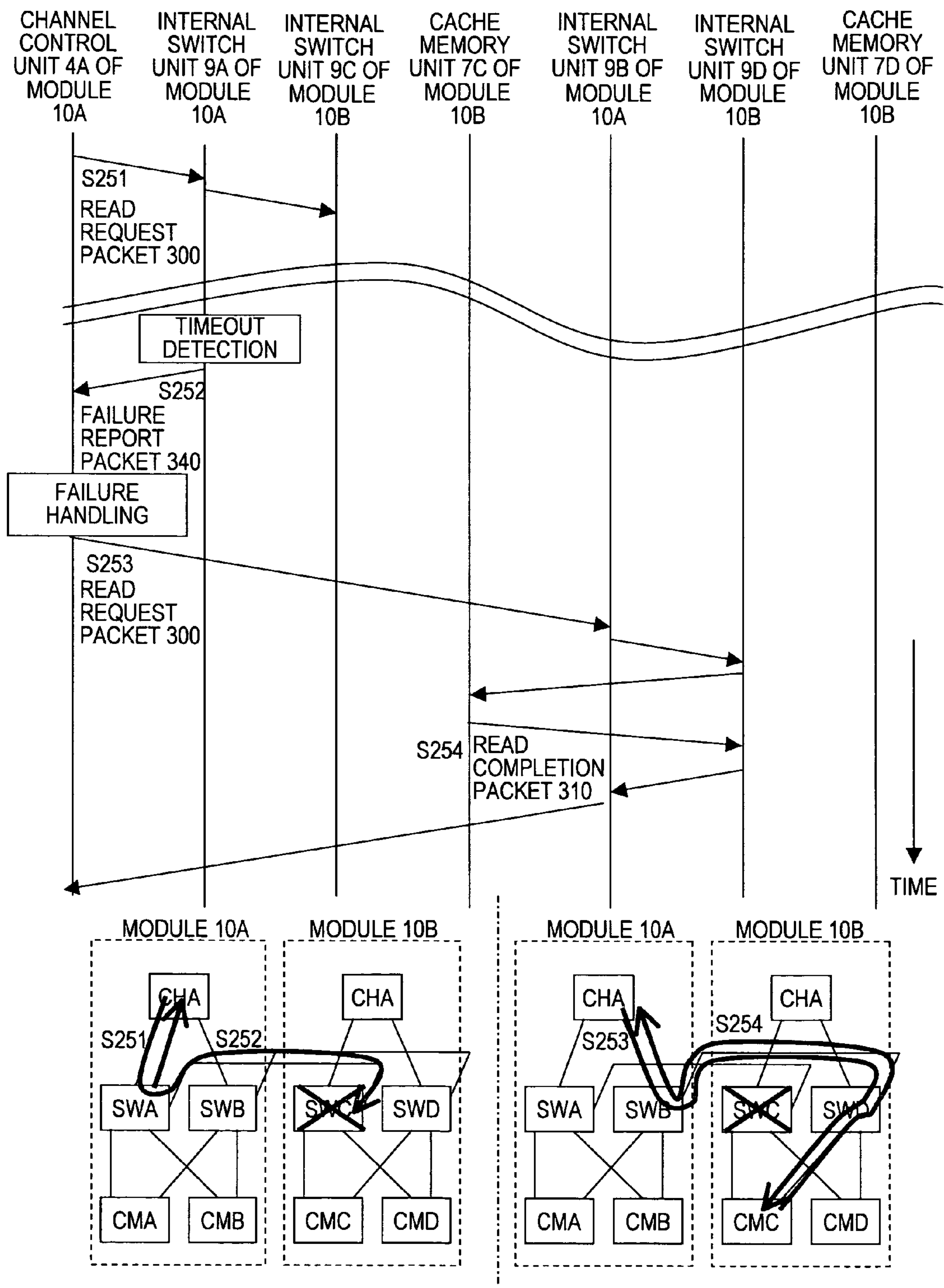
FIG. 23 is an explanatory diagram of processing that is executed in the disk controller when a failure occurs in the internal switch unit in the module according to the embodiment of this invention.

FIG. 23 is an explanatory diagram of processing that is executed in the disk controller 1 when a failure occurs in the internal switch unit 9C in the module 10B according to the embodiment of this invention.

In this explanatory diagram, the vertical direction indicates the time progress, and lines in the horizontal direction indicate components.

First, the channel control unit 4A in the module 10A sends the read request packet 300 to the cache memory unit 7C in the module 10B (S251). However, a failure in the internal switch unit 9C in the module 10B hinders the read request packet 300 from reaching the cache memory unit 7C of the destination.

Then, a given time elapses before the internal switch unit 9A in the module 10A receives the read completion packet 310 associated with the read request packet 300 that the internal switch unit 9A has transferred. The internal switch unit 9A in the module 10A at this point detects a timeout error failure and creates the failure report packet 340. The internal switch unit 9A in the module 10A sends the created failure report packet 340 to the channel control unit 4A, which has sent the read request packet 300 (S252).

The channel control unit 4A in the module 10A receives the failure report packet 340 and extracts the requester ID 342 and the tag number 343 from the failure report packet 340. The channel control unit 4A in the module 10A selects entries of the tag number table 901 whose requester ID 9012 matches the extracted requester ID 342. From these selected entries, the channel control unit 4A in the module 10A chooses an entry of the tag number table 901 whose tag number 9013 matches the extracted tag number 343.

The channel control unit 4A in the module 10A stores "invalid" in the validity field 9011 of the chosen entry, thereby invalidating the chosen entry. This prevents a situation in which timeout of the same read completion packet 310 is detected by both of the channel control unit 4A in the module 10A and the internal switch unit 9A in the module 10A. This measure does not work unless timeout values set in the channel control unit 4A in the module 10A and timeout values set in the internal switch unit 9A in the module 10A are appropriate. How timeout values are set will be described later.

The channel control unit 4A in the module 10A further executes the failure handling shown in FIG. 17. Through the failure handling, the channel control unit 4A in the module 10A judges that the detected failure is in the internal switch unit 9C in the module 10B.

The channel control unit 4A in the module 10A disables the internal switch unit 9C judged as the failure component.

The channel control unit 4A in the module 10A next sends the read request packet 300 to the cache memory unit 7C in the module 10B via the internal switch unit 9D, which is a duplicate of the internal switch unit 9C for redundancy (S253). The read request packet 300 reaches the cache memory unit 7C of the destination via the internal switch unit 9B in the module 10A and the internal switch unit 9D in the module 10B.

Receiving the read request packet 300, the cache memory unit 7C in the module 10B reads out of the memory module 72 data requested by this read request packet 300. The cache memory unit 7C in the module 10B sends the read completion packet 310 that contains the read data to the channel control unit 4A in the module 10A (S254). The cache memory unit 7C in the module 10B sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9D in the module 10B and the internal switch unit 9B in the module 10A.

The channel control unit 4A in the module 10A receives the read completion packet 310, whereby this access is completed.

In this way, when a failure occurs in the internal switch unit 9C in the module 10B, the channel control unit 4A in the module 10A can access the cache memory unit 7C in the module 10B via other internal switch units 9 than the failed internal switch unit 9C, in this example, the internal switch unit 9D.

Figure 24:
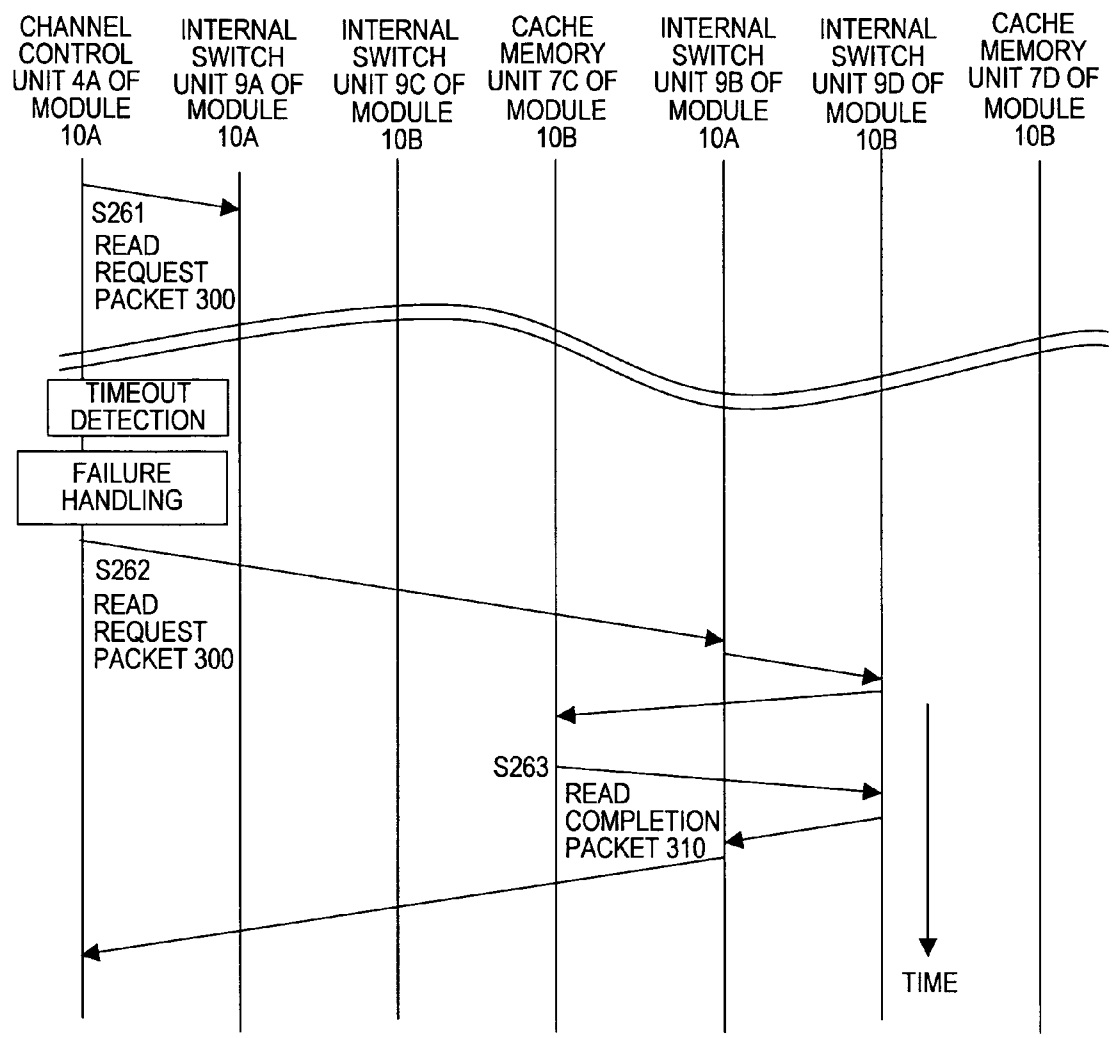
FIG. 24 is an explanatory diagram of processing that is executed in the disk controller when a failure occurs in the internal switch unit in the module according to the embodiment of this invention.
Figure 24:
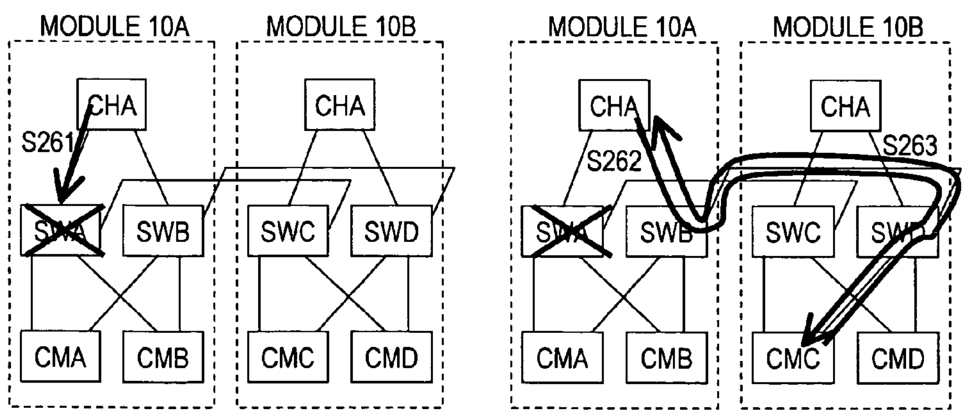

FIG. 24 is an explanatory diagram of processing that is executed in the disk controller 1 when a failure occurs in the internal switch unit 9A in the module 10A according to the embodiment of this invention.

In this explanatory diagram, the vertical direction indicates the time progress, and lines in the horizontal direction indicate components.

First, the channel control unit 4A in the module 10A sends the read request packet 300 to the cache memory unit 7C in the module 10B (S261). However, a failure in the internal switch unit 9A in the module 10A hinders the read request packet 300 from reaching the cache memory unit 7C of the destination.

Then, a given time elapses before the channel control unit 4A in the module 10A receives the read completion packet 310 associated with the read request packet 300 that the channel control unit 4A has sent. The channel control unit 4A in the module 10A at this point detects a timeout error failure and executes the failure handling shown in FIG. 17. Through the failure handling, the channel control unit 4A in the module 10A judges that the detected failure is in the internal switch unit 9A in the module 10A. The channel control unit 4A in the module 10A disables the internal switch unit 9A judged as the failure component.

The channel control unit 4A in the module 10A next sends the read request packet 300 to the cache memory unit 7C in the module 10B via the internal switch unit 9B, which is a duplicate of the internal switch unit 9A for redundancy (S262). The read request packet 300 reaches the cache memory unit 7C of the destination via the internal switch unit 9B in the module 10A and the internal switch unit 9D in the module 10B.

Receiving the read request packet 300, the cache memory unit 7C in the module 10B reads out of the memory module 72 data requested by this read request packet 300. The cache memory unit 7C in the module 10B sends the read completion packet 310 that contains the read data to the channel control unit 4A in the module 10A (S263). The cache memory unit 7C in the module 10B sends the read completion packet 310 over the internal path 15 through which the read request packet 300 has been received.

The same access path is used to transfer the read completion packet 310 and to transfer the read request packet 300 that is associated with this read completion packet 310. In other words, the read completion packet 310 reaches the channel control unit 4A, which is the source of the read request packet 300 associated with this read completion packet 310, via the internal switch unit 9D in the module 10B and the internal switch unit 9B in the module 10A.

The channel control unit 4A in the module 10A receives the read completion packet 310, whereby this access is completed.

In this way, when a failure occurs in the internal switch unit 9A in the module 10A, the channel control unit 4A in the module 10A can access the cache memory unit 7C in the module 10B via other internal switch units 9 than the failed internal switch unit 9A, in this example, the internal switch unit 9B.

In this embodiment, the disk controller 1 cannot identify a failure component unless timeout values are set appropriately. A case where timeout values are not set appropriately will be described.

Figure 25:
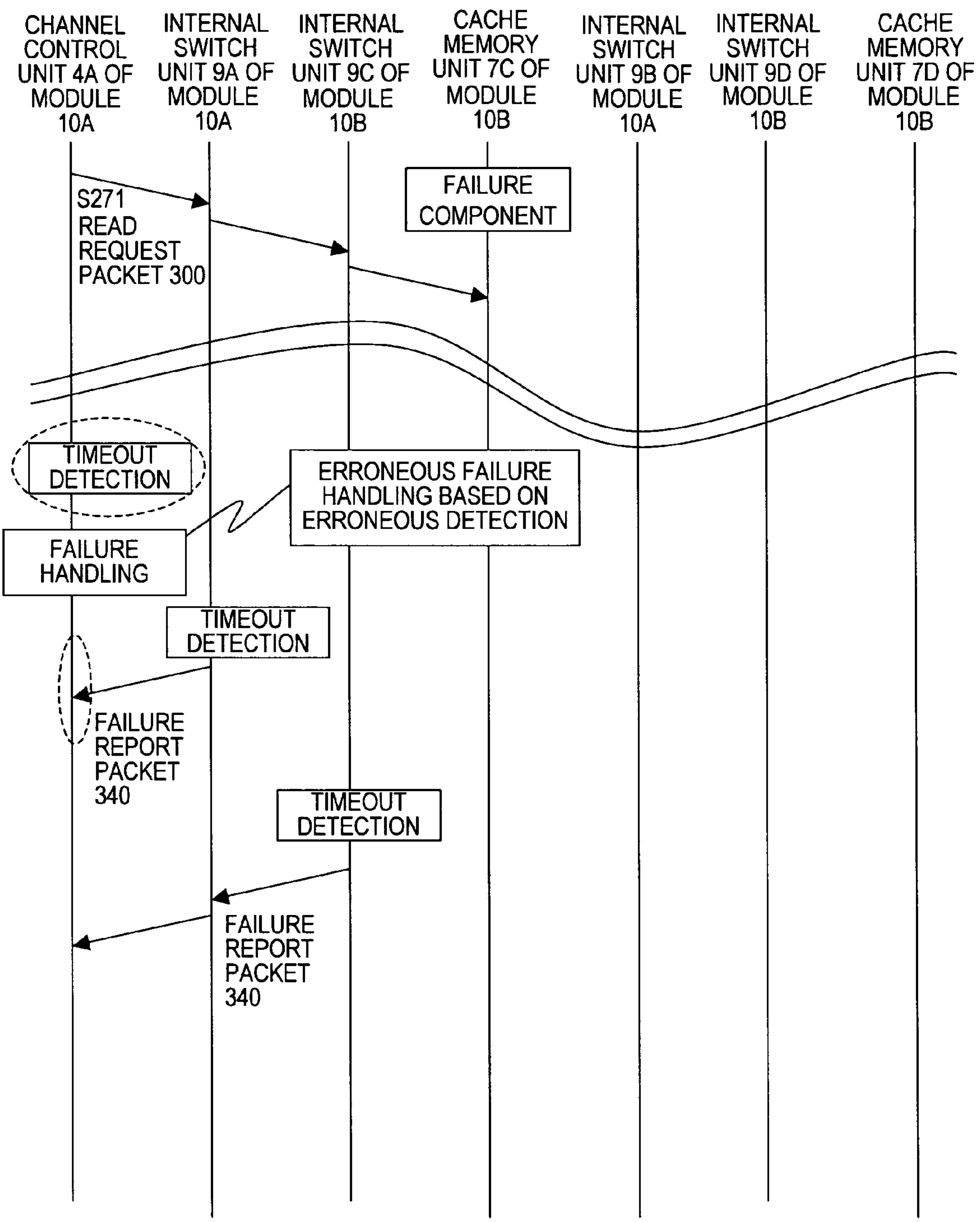
FIG. 25 is an explanatory diagram of processing that is executed in the disk controller when timeout values are not set appropriately according to the embodiment of this invention.

FIG. 25 is an explanatory diagram of processing that is executed in the disk controller 1 when timeout values are not set appropriately according to the embodiment of this invention.

In this explanatory diagram, the vertical direction indicates the time progress, and lines in the horizontal direction indicate components.

This explanatory diagram shows a case where a failure occurs in the cache memory unit 7C in the module 10B. In this explanatory diagram, the same timeout values are set in the channel control unit 4A in the module 10A, the internal switch unit 9A in the module 10A, and the internal switch unit 9C in the module 10B.

First, the channel control unit 4A in the module 10A sends the read request packet 300 to the cache memory unit 7C in the module 10B (S271). The read request packet 300 reaches the cache memory unit 7C of the destination via the internal switch unit 9A in the module 10A and the internal switch unit 9C in the module 10B.

However, the cache memory unit 7C in the module 10B is experiencing a failure and cannot send the read completion packet 310. Then, undesirably, the channel control unit 4A in the module 10A detects a timeout error failure first, before the internal switch unit 9A in the module 10A and the internal switch unit 9C in the module 10B detect the timeout error failure.

As a result of the erroneous failure detection, the channel control unit 4A in the module 10A proceeds to execute the failure handling shown in FIG. 17. The channel control unit 4A in the module 10A thus erroneously judges that the detected failure is in the internal switch unit 9A in the module 10A, instead of the cache memory unit 7C in the module 10B. In short, the channel control unit 4A in the module 10A misidentifies the component where the failure has occurred (failure component).

The channel control unit 4A in the module 10A consequently sends the read request packet 300 to the cache memory unit 7C in the module 10B via the internal switch unit 9B in the module 10A and the internal switch unit 9D in the module 10B. However, since it is the cache memory unit 7C in the module 10B that is suffering a failure, the cache memory unit 7C cannot send the read completion packet 310.

This causes the channel control unit 4A in the module 10A to detect a timeout error failure again. Accordingly, the channel control unit 4A in the module 10A erroneously judges that the detected failure is in the internal switch unit 9B in the module 10A. In other words, the channel control unit 4A in the module 10A comes to a wrong conclusion that the internal switch unit 9A and the internal switch unit 9B in the module 10A are both experiencing failures, and believes that there is no path left to access the cache memory unit 7C in the module 10B. This results in shutting down of the entire computer system.

Setting timeout values appropriately is thus important in building highly reliable storage systems. Now, how to set timeout values properly will be described.

FIG. 26 is a configuration diagram of a connected component type timeout value (TOV) table 2010 according to the embodiment of this invention.

The connected component type TOV table 2010 contains a destination type 2011 and a timeout value 2012.

The destination type 2011 indicates the type of a component to which a packet is transferred from the internal switch unit 9. The timeout value 2012 indicates a timeout value set in the internal switch unit 9 when the internal switch unit 9 accesses a component that is indicated by the destination type 2011.

The timeout value 2012 is determined by, for example, taking into consideration the longest delay in normal access from the internal switch unit 9 to a component that is indicated by the destination type 2011. Desirably, a delay due to competition is also taken into account in determining the timeout value 2012.

The internal switch unit 9 may make dummy access to each component in order to measure the response time to the access. In this case, the timeout value 2012 is determined based on the response time measured by the internal switch unit 9.

The following description is on access between different modules in which the internal switch unit 9 accesses a component in any other module 10 than the one having the accessing internal switch unit 9. In this case, a timeout value is set not only in the accessing internal switch unit 9 but also in the internal switch unit 9 that is in the same module 10 as the accessed component. For correct failure component identification, the longest delay in access between components located within the same module 10 must be considered in determining the timeout value set in the internal switch unit 9 in the case of access between different modules 10.

The timeout value set in the internal switch unit 9 for access between different modules 10 has to be larger than the timeout value that is set in the internal switch unit 9 for access to the FM cache memory unit 70 located within the same module 10. For instance, the timeout value set in the internal switch unit 9 for access between different modules 10 is twice as large as the timeout value that is set in the internal switch unit 9 when this internal switch unit 9 accesses the FM cache memory unit 70 within the same module 10.

FIG. 27 is a configuration diagram of the internal switch unit timeout value (TOV) table 2020 which is stored in the internal switch unit 9 according to the embodiment of this invention.

The internal switch unit TOV table 2020 shows a timeout value set to each port in the internal switch unit 9. The internal switch unit TOV table 2020 contains a port number 2021 and a timeout value 2022.

The port number 2021 indicates an identifier unique to each port in the internal switch unit 9. The timeout value 2022 indicates a timeout value set to a port that is identified by the port number 2021. The timeout value 2022 is therefore stored in the TOV configuration register 902 of the packet checker 90 that is associated with the port identified by the port number 2021.

The internal switch unit TOV table 2020 is created based on the connected component type TOV table 2010. Details of how the internal switch unit TOV table 2020 is created will be described with reference to FIG. 30.

FIG. 28 is a configuration diagram of a channel control unit timeout value (TOV) table 2030 which is stored in the channel control unit 4 according to the embodiment of this invention.

The channel control unit TOV table 2030 contains a destination type 2031 and a timeout value 2032.

The destination type 2031 indicates the type of a component to which a packet is transferred from the channel control unit 4. The timeout value 2032 indicates a timeout value set in the channel control unit 4 when the channel control unit 4 accesses a component indicated by the destination type 2031. The timeout value 2032 is therefore stored in the TOV configuration register 902 of the packet checker 90 that is in the channel control unit 4.

It is sufficient if one of the processor 111 or the packet control unit 118 stores the timeout value 2032 in the TOV configuration register 902 of the packet checker 90. Alternatively, the packet checker 90 may choose the TOV configuration register 902 that is associated with the destination of the packet from among a plurality of TOV configuration registers 902 that store timeout values. The packet checker 90 uses a timeout value stored in the chosen TOV configuration register 902.

The channel control unit TOV table 2030 holds a time value set in the channel control unit 4 for intra module access as well as a timeout value set in the channel control unit 4 for access between different modules.

The channel control unit TOV table 2030 is created based on the connected component type TOV table 2010. Details of how the channel control unit TOV table 2030 is created will be described with reference to FIG. 29.

The disk control unit 5 stores a table similar to the channel control unit timeout value table 2030.

Figure 29:
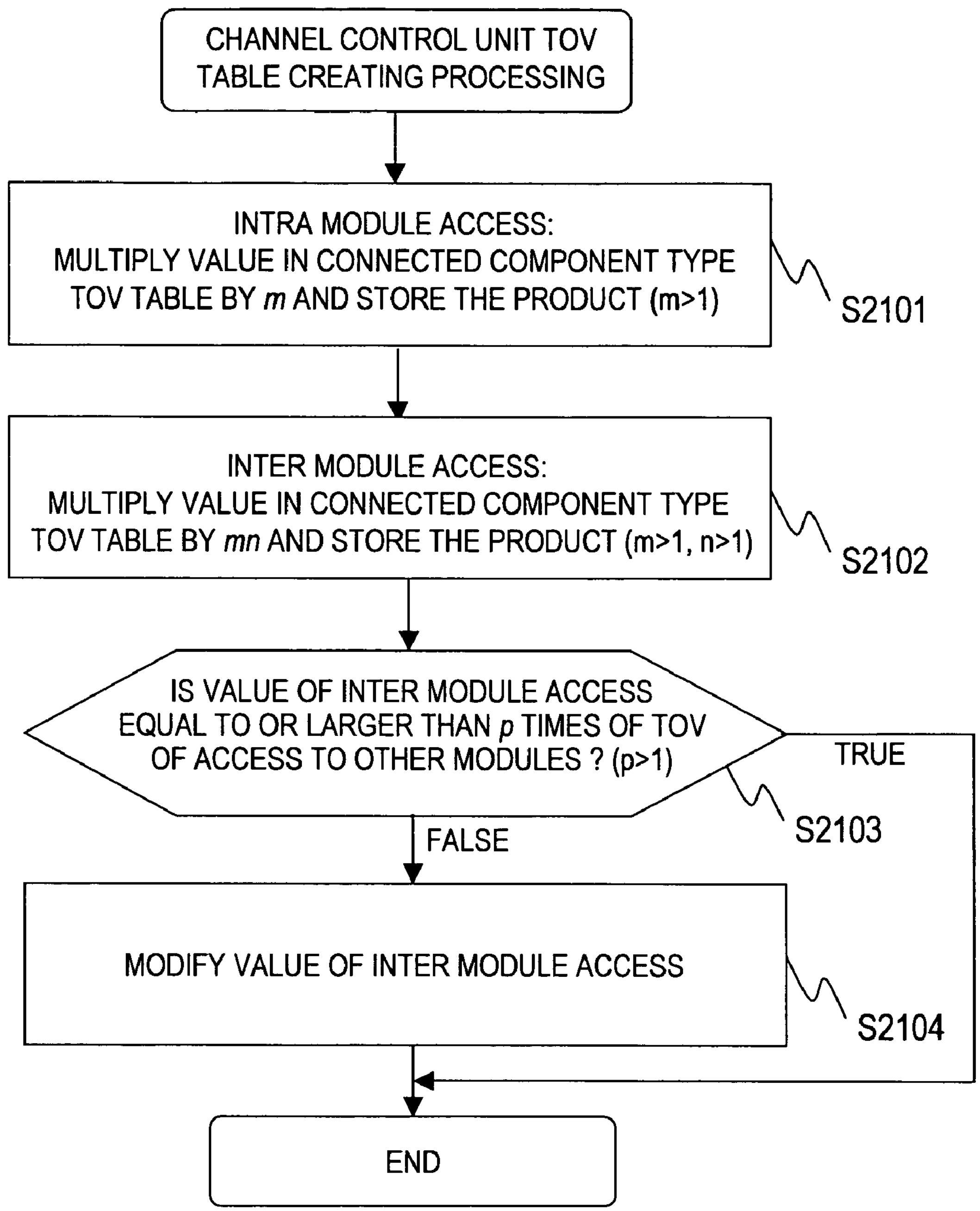
FIG. 29 is a flow chart for processing of creating the channel control unit TOV table according to the embodiment of this invention.

FIG. 29 is a flow chart for processing of creating the channel control unit TOV table 2030 according to the embodiment of this invention.

First, the channel control unit 4 multiplies the timeout value 2012 of the connected component type table 2010 by an internal switch unit constant m, thereby obtaining a timeout value to be set in the channel control unit 4 for intra module access. The channel control unit 4 stores the obtained timeout value as the timeout value 2032 in the channel control unit TOV table 2030 (S2101).

The internal switch unit constant m is a constant corresponding to a delay in transmission of a packet from the internal switch unit 9 to the channel control unit 4. Therefore, the internal switch unit constant m is larger than "1". The internal switch unit constant m in this embodiment is set to "2".

The channel control unit 4 may obtain a timeout value to be set in the channel control unit 4 for intra module access by adding the worst internal switch unit delay value to the timeout value 2012 of the connected component type table 2010.

The worst internal switch unit delay value is a value representing the worst possible delay in transmission of a packet from the internal switch unit 9 to the channel control unit 4.

Next, the channel control unit 4 multiplies the timeout value 2012 of the connected component type table 2010 by the internal switch unit constant m and an other module constant n, thereby obtaining a timeout value to be set in the channel control unit 4 for access between different modules. The channel control unit 4 stores the obtained timeout value as the timeout value 2032 in the channel control unit TOV table 2030 (S2102).

The other module constant n is a constant corresponding to a delay required for packet transmission between the internal switch units 9. Therefore, the other module constant n is larger than “1”. The other module constant n in this embodiment is set to “4”.

The channel control unit 4 may obtain a timeout value to be set in the channel control unit 4 for inter module access by adding the worst internal switch unit delay value and the worst inter module delay value to the timeout value 2012 of the connected component type table 2010. The worst inter module delay value is a value representing the worst possible delay in packet transmission between the internal switch units 9.

The channel control unit 4 then extracts from the connected component type table 2010 the timeout value 2012 that is set in the internal switch unit 9 for access between different modules 10. The channel control unit 4 multiplies the extracted timeout value 2012 by a margin constant p, thereby obtaining a lower limit value. The margin constant p is larger than “1”. The margin constant p in this embodiment is set to “1.5”. The lower limit value is a value representing the lowest possible timeout value set in the channel control unit 4 for inter module access.

The channel control unit 4 next judges, for each timeout value to be set in the channel control unit 4 for inter module access, whether or not the timeout value is equal to or larger than the lower limit value (S2103). When every timeout value to be set in the channel control unit 4 for inter module access is equal to or larger than the lower limit value, the channel control unit 4 immediately ends the channel control unit TOV table creating processing.

On the other hand, when even one timeout value to be set in the channel control unit 4 for inter module access is below the lower limit value, the channel control unit 4 modifies every timeout value that is below the lower limit value to make the timeout value equal to the lower limit value (S2104). For instance, the channel control unit 4 modifies a timeout value “200”, which is set for access to the shared memory unit 8, to a lower limit value “300”. The channel control unit 4 then ends the channel control unit TOV table creating processing.

Figure 30:
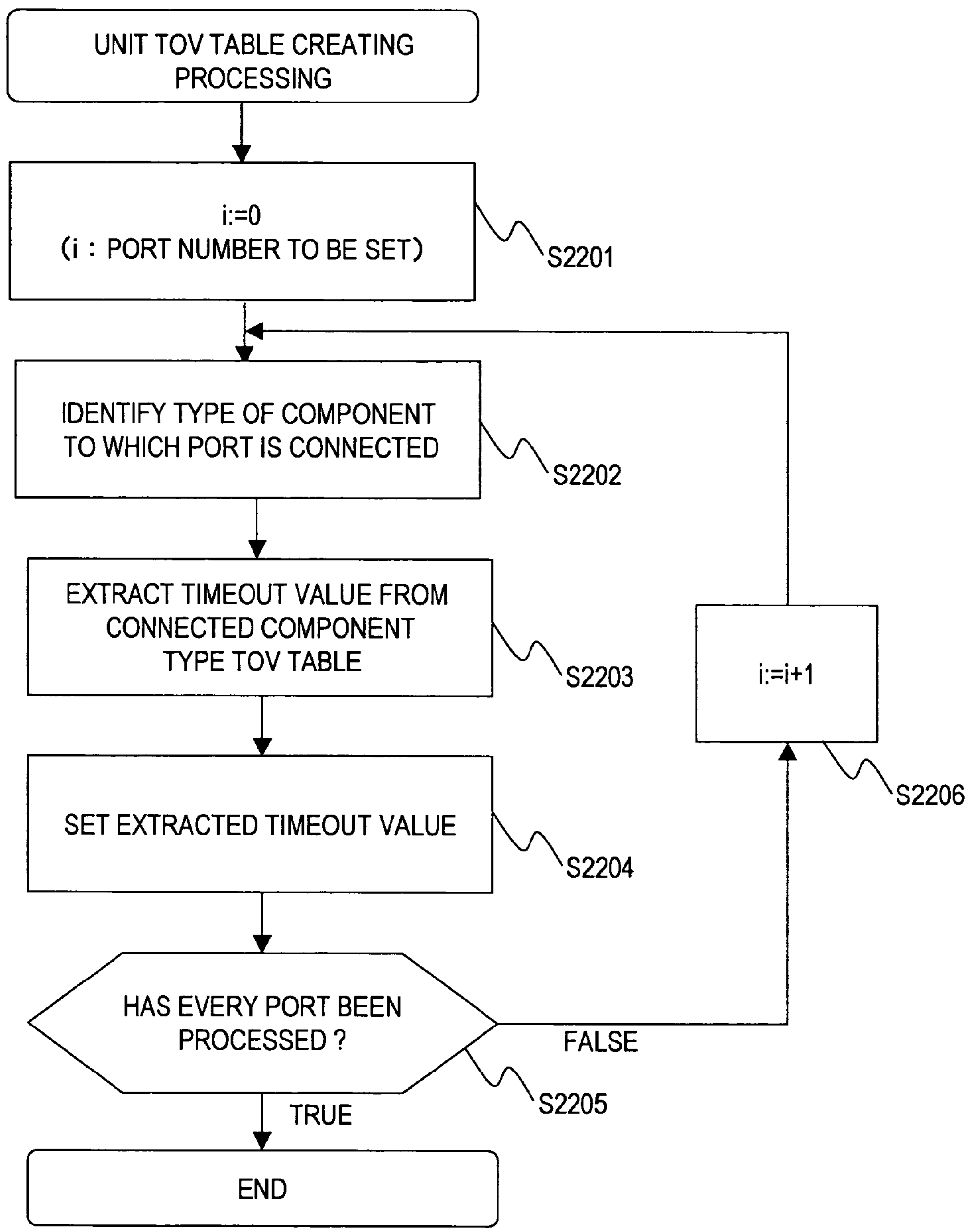
FIG. 30 is a flow chart for processing of creating the internal switch unit TOV table according to the embodiment of this invention.

FIG. 30 is a flow chart for processing of creating the internal switch unit TOV table 2020 according to the embodiment of this invention.

The internal switch unit 9 executes the internal switch unit TOV table creating processing when the storage system is initially set or changes the configuration.

First, the internal switch unit 9 sets “0” as a variable i indicating the number of a port to which a timeout value is set (S2201).

The internal switch unit 9 next identifies the type of a component to which the port identified by the variable i is connected (S2202). The internal switch unit 9 identifies the type of the component by, for example, referring to configuration information stored in the shared memory unit 8.

The internal switch unit 9 extracts from the connected component type table 2010 the timeout value 2012 that is associated with the identified component type (S2203).

Next, the internal switch unit 9 chooses from the internal switch unit TOV table 2020 a column that has the same port number 2021 as the variable i. The internal switch unit 9 stores the extracted timeout value 2012 as the timeout value 2022 of the chosen column (S2204).

The internal switch unit 9 then judges whether or not every port in the internal switch unit 9 has finished being processed (S2205). When there are still ports left to be processed, the internal switch unit 9 adds “1” to the variable i (S2206). Thereafter, the internal switch unit 9 returns to Step S2202 to repeat the processing.

When there is no port left to be processed, the internal switch unit 9 ends the internal switch unit TOV table creating processing.

Initial setting of the storage system is performed before the storage system starts running. Therefore, immediate failure component identification is not required, and the internal switch unit 9 may automatically set a large timeout value to all ports when the storage system is set initially.

The internal switch unit 9 may set a large timeout value also for special access to set various settings (setting access). Alternatively, the internal switch unit 9 may omit timeout error detection in setting access.

The internal switch unit 9 may calculate the timeout value by analyzing the request packet 300 or 320 to be transferred. In this way, the accuracy of the timeout value is improved.

Figure 31:
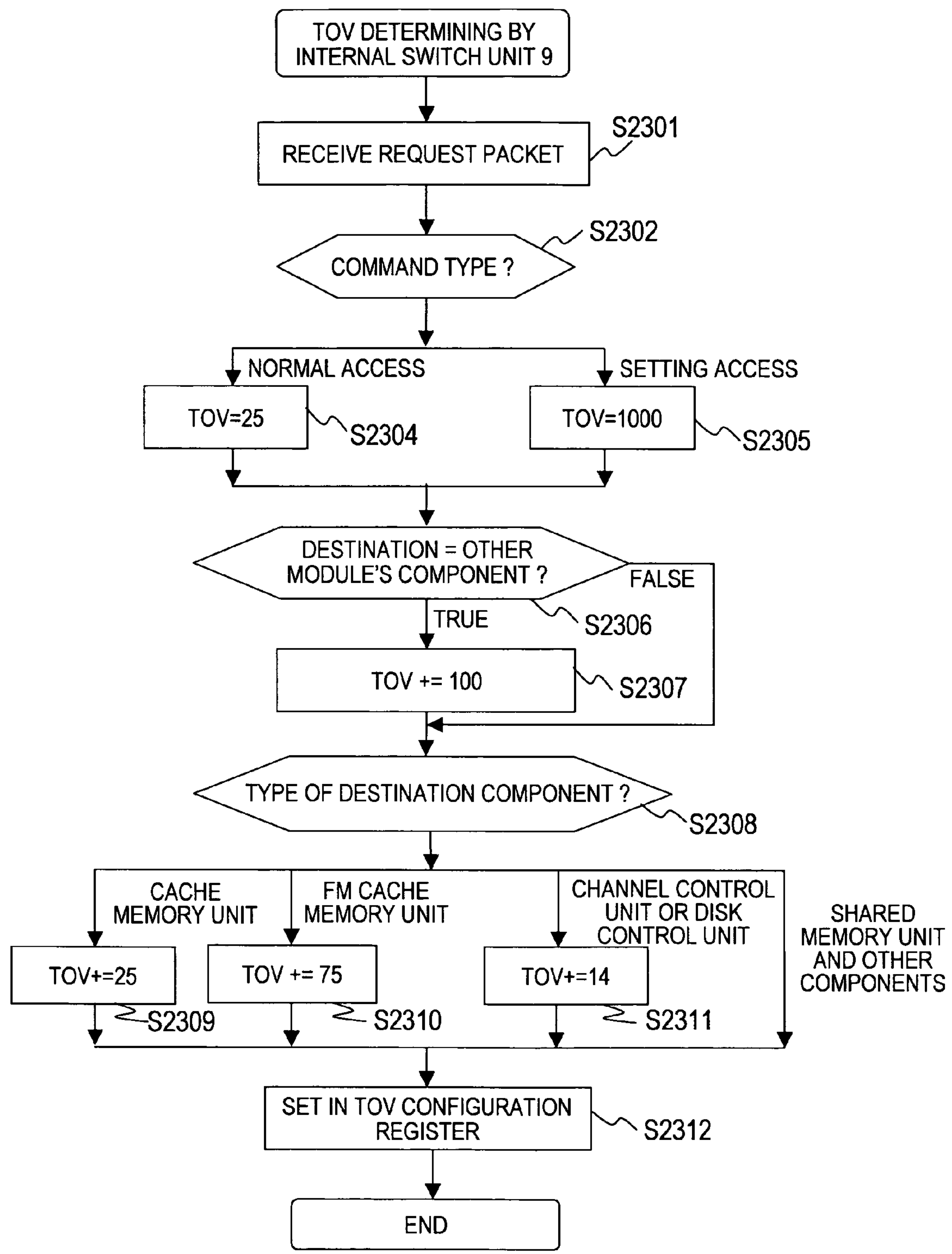
FIG. 31 is a flow chart for timeout value calculation processing which is executed by the internal switch unit according to the embodiment of this invention.

FIG. 31 is a flow chart for timeout value calculation processing which is executed by the internal switch unit 9 according to the embodiment of this invention.

The internal switch unit 9 receives a request packet and executes the timeout value calculation processing (S2301). First, the internal switch unit 9 analyzes the received request packet. The internal switch unit 9 judges through the analysis the command type of the received request packet (S2302).

When the received request packet is the read request packet 300 or the write request packet 320, the internal switch unit 9 judges the command type as normal access. The internal switch unit 9 in this case substitutes the worst delay value of a component that has the smallest worst delay value for the variable TOV. In this embodiment, the internal switch unit 9 substitutes “25”, which is the worst delay value of the shared memory unit 8, for the variable TOV (S2304). The worst delay value of the shared memory unit 8 is a value representing the worst delay in transmission of a packet from the internal switch unit 9 to the shared memory unit 8.

When judging that the command type is setting access, on the other hand, the internal switch unit 9 substitutes “1000” for the variable TOV (S2305). This is because, as mentioned above, a large timeout value is preferable when it is setting access.

The internal switch unit 9 next identifies a component to which the received request packet is sent. The internal switch unit 9 judges whether or not the destination component is in any other module 10 than the one having this internal switch unit 9 (S2306).

When the internal switch unit 9 and the destination component are in the same module 10, the internal switch unit 9 proceeds directly to Step S2308.

When the internal switch unit 9 and the destination component are in different modules 10, the internal switch unit 9 adds “100”, which is the worst delay value of the internal switch unit 9, to the variable TOV (S2307).

The internal switch unit 9 next identifies the type of the destination component of the received request packet (S2308). When the destination component is the cache memory unit 7, the internal switch unit 9 adds "25" to the variable TOV (S2309). The internal switch unit 9 then moves to Step S2312.

When the destination component is the FM cache memory unit 70, the internal switch unit 9 adds "75" to the variable TOV (S2310). The internal switch unit 9 then moves to Step S2312.

When the destination component is the channel control unit 4 or the disk control unit 5, the internal switch unit 9 adds "14" to the variable TOV (S2311). The internal switch unit 9 then moves to Step S2312.

When the destination component is the shared memory unit 8 or unknown, the internal switch unit 9 proceeds directly to Step S2312.

Next, the internal switch unit 9 stores the variable TOV in the TOV configuration register 902 (S2312). The internal switch unit 9 then ends the timeout value calculation processing.

The internal switch unit 9 is not the only component that is allowed to perform the timeout value calculation processing, and the channel control unit 4 and the disk control unit 5 may execute the timeout value calculation processing. However, values substituted for and added to the variable TOV in the timeout value calculation processing that is executed by the channel control unit 4 and the disk control unit 5 are different from those in the timeout value calculation processing that is executed by the internal switch unit 9.

Every timeout value set to a component has to be smaller than the timeout value of the host computer 2. When the host computer 2 has a timeout value "TOV_h", the disk controller 1 must finish within the time "TOV_h" processing requested by the host computer 2.

For example, read access shown in FIG. 3 requires the channel control unit 4 to access the shared memory unit 8 at least six times. The channel control unit 4 further needs to access the cache memory unit 7 at least twice.

Accordingly, Expression (1) given below has to be satisfied for successful identification of a failure component. In other words, the disk controller 1 needs to have a component that satisfies Expression (1):

$$TOV\_h>6\times T\_CSM+2\times T\_CFM+T\_S710+T\_ovh \quad (1)$$

wherein "T_CSM" represents a timeout value set in the channel control unit 4 when the channel control unit 4 accesses the shared memory unit 8, "T_CFM" represents a timeout value set in the channel control unit 4 when the channel control unit 4 accesses the FM cache memory unit 70, "T_S710" represents the longest possible time required for the disk control unit 5 to obtain read data from the HDD 3 in the processing of Step S710 in FIG. 3, and "T_ovh" represents the worst delay due to overhead.

While the present invention has been described in detail and pictorially in the accompanying drawings, the present invention is not limited to such detail but covers various obvious modifications and equivalent arrangements, which fall within the purview of the appended claims.

What is claimed is:

1. A disk controller for controlling read/write of data from/to a disk drive, comprising:

a plurality of channel control units coupled to a host computer via channels;

a plurality of cache memory units for temporarily storing data requested by the host computer to be read/written;

a plurality of disk control units coupled to the disk drive; and a plurality of internal switch units for coupling the plurality of channel control units, the plurality of cache memory units, and the plurality of disk control units to one another, wherein one of the plurality of channel control units or one of the plurality of disk control units sends to one of the plurality of cache memory units a request packet which requests execution of processing, wherein the one of the plurality of cache memory units receives the request packet from the one of the plurality of channel control units or the one of the plurality of disk control units, wherein the one of the plurality of cache memory units executes the processing that is requested by the received request packet, wherein the one of the plurality of cache memory units sends, in response to the received request packet, a response packet to the one of the plurality of channel control units and the disk control unit, which has sent the request packet, wherein one of the internal switch units monitors the request packet sent from the one of the plurality of channel control units or the one of the plurality of disk control units and the response packet sent from the one of the cache memory units, wherein the one of the plurality of internal switch units judges whether or not the response packet to the request packet has passed through the one of the plurality of the internal switch units within a first given time period since the passage of the request packet, wherein the one of the plurality of the internal switch units sends a failure notification in a case where the response packet has not passed through one of plurality of the internal switch units within the first given time period, wherein the one of the plurality of channel control units or the one of the plurality of disk control units monitors the response packet to the sent request packet, wherein the one of the plurality of channel control units or the one of the plurality of disk control units judges whether the response packet to the request packet has been received within a second given time period since the sending of the request packet, wherein the one of the plurality of channel control units or the one of the plurality of disk control units judges that a failure has occurred in the one of the plurality of internal switch units in a case where the failure notification has not been received from the one of the plurality of internal switch units, and in a case where the response packet has not been received within the second given time period, wherein, one of each of the plurality of channel control units, each of the plurality of disk control units, each of the plurality of internal switch units, and each of the plurality of cache memory units are coupled to one another via internal paths, wherein the one of the plurality of internal switch units or the one of the plurality of channel control units or the one of the plurality of disk control units calculates the first given time period based on the one of the plurality of internal switch units, a type of the request packet, and a destination among the plurality of cache memory units, wherein the one of the plurality of internal switch units sends, in the case where the response packet has not passed through the one of the plurality of internal switch units within the first given time period, a specific of the failure and the failure notification to the one of the plurality of channel control units or the one of the plurality of disk control units, which has sent the request packet, wherein the one of the plurality of channel control units or the one of the plurality of disk control units comprises a packet checker for managing an association between the request packet and the response packet to thereby detect a failure occurring within a range of units coupled via the internal paths to the one of the plurality of channel control units or the one of the plurality of disk control units, wherein the one of the plurality of channel control units or the one of the plurality of disk control units calculates the second given time period based on the type of the request packet and the destination among the plurality of cache memory units, wherein the packet checker monitors the response packet to the sent request packet, wherein the packet checker judges whether or not the response packet to the request packet has been received within the second given time period since the sending of the request packet, wherein the packet checker sends, in the case where the response packet has not been received within the second given time period, the specific of the failure and the failure notification to the one of the plurality of channel control units or the one of the plurality of disk control units, wherein the one of the plurality of channel control units or the one of the plurality of disk control units identifies, in a case where the specific of the failure indicates a timeout error, and in a case where the failure notification has been sent by the packet checker, the failure occurring in the one of the plurality of internal switch units, and disables the internal path through the one of the internal switch, and sends the request packet to the one of the plurality of cache memory through another of the plurality of internal switch units, wherein the one of the plurality of channel control units or the one of the plurality of disk control units identifies, in the case where the specific of the failure indicates the timeout error, and in a case where the failure notification has been sent by the one of the plurality of internal switch units, the failure occurring in the one of the plurality of cache memory units, and disables the one of the plurality of cache memory units, to which the request packet has been sent, and sends the request packet to the other cache memory via the internal path, wherein the one of the plurality of channel control units or the one of the plurality of disk control units identifies, in a case where the specific of the failure indicates a link down error, and in the case where the failure notification has been sent by the packet checker, the failure occurring in the internal path between the one of the plurality of channel control units or the one of the plurality of disk control units and the one of the plurality of internal switch, and disables the internal path identified that the failure occurs, and sends the request packet to the one of the plurality of cache memory units from the one of the plurality of channel control units or the one of the plurality of disk control units via the other internal paths, and wherein the one of the plurality of channel control units or the one of the plurality of disk control units identifies, in the case where the specific of the failure indicates the link down error, and in the case where the failure notification has been sent by the one of the plurality of internal switch units, the failure occurring in the internal paths between the one of the plurality of internal switch units and the one of the plurality of cache memory units, and disables the internal path between the one of the plurality of internal switch units and the one of the plurality of cache memory units, sends the request packets to the one of the plurality of cache memory units from the one of the plurality of internal switch units via the other internal paths.

2. The disk controller according to claim 1, wherein, upon reception of the failure notification from the internal switch unit, the one of the channel control unit and the disk control unit ends the response packet monitoring.

3. The disk controller according to claim 1, wherein each of the plurality of internal switch units has a plurality of ports, wherein each of the plurality of ports is coupled to at least one of the plurality of channel control units, one of the plurality of disk control units, one of the plurality of cache memory units, and another one of the plurality of internal switch units and wherein each of the plurality of internal switch units sets the first given time period depending on a destination to which the each of the plurality of ports is coupled.

4. A storage system, comprising:

a disk drive for storing data requested by a host computer to be read/written;

a plurality of channel control units coupled to the host computer via channels;

a plurality of cache memory units for temporarily storing data requested by the host computer to be read/written;

a plurality of disk control units coupled to the disk drive; and a plurality of internal switch units for coupling the plurality of channel control units, the plurality of cache memory units, and the plurality of disk control units to one another, wherein one of the plurality of channel control units or one of the plurality of the disk control units sends to one of the plurality of cache memory units a request packet which requests execution of processing, wherein the one of the plurality of the cache memory units receives the request packet from the one of the plurality of the channel control units or the one of the plurality of disk control units, wherein the one of the plurality of the cache memory units executes the processing that is requested by the received request packet, wherein the one of the plurality of the cache memory units sends, in response to the received request packet, a response packet to the one of the plurality of channel control units or the one of the plurality of disk control units, which has sent the request packet, wherein one of the plurality of the internal switch units monitors the request packet sent from the one of the plurality of the channel control units or the one of the plurality of disk control units and the response packet sent from the cache memory unit, wherein the one of the plurality of internal switch units judges whether or not the response packet to the request packet has passed through the one of the plurality of the internal switch units within a first given time period since the passage of the request packet, wherein the one of the plurality of the internal switch units sends a failure notification in a case where the response packet has not passed through the one of the plurality of the internal switch units within the first given time period, wherein the one of the plurality of channel control units or the one of the plurality of disk control units monitors the response packet to the sent request packet, wherein the one of the plurality of channel control units or the one of the plurality of disk control units judges whether or not the response packet to the request packet has been received within a second given time period since the sending of the request packet, wherein the one of the plurality of channel control units or the one of the plurality of disk control units judges that a failure has occurred in the one of the plurality of internal switch units in a case where the failure notification has not been received from the one of the plurality of internal switch units, and in a case where the response packet has not been received within the second given time period, wherein, in the same component, one of each of the plurality of channel control units, each of the plurality of disk control units, each of the plurality of internal switch units, and each of the plurality of cache memory units are coupled to one another via internal paths, wherein the one of the plurality of internal switch units or the one of the plurality of channel control units or the one of the plurality of disk control units calculates the first given time period based on the one of the plurality of internal switch units, a type of the request packet, and a destination among the plurality of cache memory units, wherein the one of the plurality of internal switch units sends, in the case where the response packet has not passed through the one of the plurality of internal switch units within the first given time period, a specific of the failure and the failure notification to the one of the plurality of channel control units and the one of the plurality of disk control units, which has sent the request packet, wherein the one of the plurality of channel control units or the one of the plurality of disk control units comprises a packet checker for managing an association between the request packet and the response packet to thereby detect a failure occurring within a range of units coupled via the internal paths to the one of the plurality of channel control units or the one of the plurality of disk control units, wherein the one of the plurality of channel control units or the one of the plurality of disk control units calculates the second given time period based on the type of the request packet and the destination among the plurality of cache memory units, wherein the packet checker monitors the response packet to the sent request packet, wherein the packet checker judges whether or not the response packet to the request packet has been received within the second given time period since the sending of the request packet, wherein the packet checker sends, in the case where the response packet has not been received within the second given time period, the specific of the failure and the failure notification to the one of the plurality of channel control units or the one of the plurality of disk control units, wherein the one of the plurality of channel control units or the one of the plurality of disk control units identifies, in a case where the specific of the failure indicates a timeout error, and in a case where the failure notification has been sent by the packet checker, the failure occurring in the one of the plurality of internal switch units, and disables the internal path through the one of the internal switch, and sends the request packet to the one of the plurality of cache memory through another of the plurality of internal switch units, wherein the one of the plurality of channel control units or the one of the plurality of disk control units identifies, in the case where the specific of the failure indicates the timeout error, and in a case where the failure notification has been sent by the one of the plurality of internal switch units, the failure occurring in the one of the plurality of cache memory units, and disables the one of the plurality of cache memory units, to which the request packet has been sent, and sends the request packet to the other cache memory via the internal path, wherein the one of the plurality of channel control units or the one of the plurality of disk control units identifies, in a case where the specific of the failure indicates a link down error, and in the case where the failure notification has been sent by the packet checker, the failure occurring in the internal path between the one of the plurality of channel control units and the one of the plurality of disk control units and the one of the plurality of internal switch, and disables the internal path identified that the failure occurs, and sends the request packet to the one of the plurality of cache memory units from the one of the plurality of channel control units or the one of the plurality of disk control units via the other internal paths, and wherein the one of the plurality of channel control units or the one of the plurality of disk control units identifies, in the case where the specific of the failure indicates the link down error, and in the case where the failure notification has been sent by the one of the plurality of internal switch units, the failure occurring in the internal paths between the one of the plurality of internal switch units and the one of the plurality of cache memory units, and disables the internal path between the one of the plurality of internal switch units and the one of the plurality of cache memory units, sends the request packets to the one of the plurality of cache memory units from the one of the plurality of internal switch units via the other internal paths.

5. The storage system according to claim 4, wherein, when the identified failure component is the cache memory unit, the one of the channel control unit or the disk control unit sets a cache memory that is a duplicate of the failure component cache memory for redundancy as a new destination of the request packet, and resends the request packet to the redundant cache memory.

6. The storage system according to claim 4, wherein, upon reception of the failure notification from the one of the internal switch units, the one of the channel control unit and the disk control unit ends the response packet monitoring.

7. The storage system according to claim 4, wherein each of the plurality of the internal switch units has a plurality of ports, wherein each of the plurality of ports is coupled to at least one of the plurality of channel control units, one of the plurality of disk control units, one of the plurality of cache memory units, and another one of the plurality of internal switch units, and wherein each of the plurality of internal switch units sets the first given time period depending on a destination to which the each of the plurality of ports is coupled.

8. The disk controller according to claim 1, the disk controller comprising a first module coupled to a second module via the paths coupling modules;

wherein each of the first module and the second module includes the one of the plurality of channel control units, the one of the plurality of disk control units, the one of the plurality of internal switch units, and the one of the plurality of cache memory units, wherein the one of the plurality of channel control units or the one of the plurality of disk control units included in the first module sends the request packets via the other internal switch or the other internal path in the second module, in a case where the failure notification has been sent by the packet checker or the plurality of internal switch units included in the second module.

9. The storage system according to claim 4, the disk controller comprising:

a first module couple to a second module via the paths coupling modules;

wherein each of the first module and the second module includes the one of the plurality of channel control units, the one of the plurality of disk control units, the one of the plurality of internal switch units, and the one of the plurality of cache memory units, wherein the one of the plurality of channel control units or the one of the plurality of disk control units included in the first module sends the request packets via the other internal switch or the other internal path in the second module, in a case where the failure notification has been sent by the packet checker or the plurality of internal switch units included in the second module.

* * * * *